(12) United States Patent
Bruce et al.

(10) Patent No.: US 8,108,138 B2
(45) Date of Patent: Jan. 31, 2012

(54) OPTIMAL VEHICLE ROUTER WITH ENERGY MANAGEMENT SYSTEM

(75) Inventors: Alan Eugene Bruce, Kent, WA (US); Daniel J. Gadler, Mercer Island, WA (US); Kyle Masao Nakamoto, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 661 days.

(21) Appl. No.: 12/244,291

(22) Filed: Oct. 2, 2008

(65) Prior Publication Data

US 2010/0088011 A1 Apr. 8, 2010

(51) Int. Cl.
*G01C 21/00* (2006.01)
(52) U.S. Cl. ........................................... 701/200
(58) Field of Classification Search ............... 701/123, 701/201, 202, 200; 73/114
See application file for complete search history.

(56) References Cited

U.S. PATENT DOCUMENTS

| | | | |
|---|---|---|---|
| 6,014,606 A | 1/2000 | Tu | |
| 6,085,147 A | 7/2000 | Myers | |
| 6,285,951 B1 | 9/2001 | Gaskins et al. | |
| 6,691,007 B2 | 2/2004 | Haugse et al. | |
| 6,917,860 B1 | 7/2005 | Robinson et al. | |
| 7,209,829 B2 | 4/2007 | Litvack et al. | |
| 7,471,995 B1 | 12/2008 | Robinson | |
| 7,860,646 B2 | 12/2010 | Bruce et al. | |
| 7,949,465 B2 | 5/2011 | Bruce et al. | |
| 2001/0029425 A1 | 10/2001 | Myr | |
| 2002/0188387 A1* | 12/2002 | Woestman et al. | 701/22 |
| 2003/0236818 A1 | 12/2003 | Bruner | |
| 2004/0030493 A1 | 2/2004 | Pechatnikov | |
| 2006/0161337 A1* | 7/2006 | Ng | 701/201 |
| 2006/0241855 A1 | 10/2006 | Joe et al. | |
| 2006/0242108 A1 | 10/2006 | Cuspard et al. | |
| 2007/0233364 A1 | 10/2007 | Kumar | |
| 2007/0262855 A1 | 11/2007 | Zuta et al. | |
| 2008/0021132 A1 | 1/2008 | Kim | |
| 2008/0125924 A1 | 5/2008 | Daum et al. | |
| 2008/0125958 A1* | 5/2008 | Boss et al. | 701/123 |
| 2008/0249667 A1* | 10/2008 | Horvitz et al. | 701/1 |
| 2010/0088011 A1* | 4/2010 | Bruce et al. | 701/200 |
| 2010/0094496 A1* | 4/2010 | Hershkovitz et al. | 701/22 |

(Continued)

FOREIGN PATENT DOCUMENTS

EP 1566665 8/2005

(Continued)

OTHER PUBLICATIONS

David Wettergreen et al., Robotic Planetary Exploration by Sun-Synchronous navigation, Jun. 2001, Carnegie Mellon University, pp. 1-8.*

(Continued)

*Primary Examiner* — James Trammell
*Assistant Examiner* — Michael D Lang
(74) *Attorney, Agent, or Firm* — Yee & Associates, P.C.

(57) ABSTRACT

A method is present for generating a route for a vehicle. A start point and an end point are identified for the vehicle. A spatial model of terrain encompassing the start point and the end point is identified to form an identified spatial model. The route for the vehicle is generated from the start point to the end point using the spatial model based on a cost to traverse a grid point within a grid to meet a number of criteria for energy management for the vehicle.

37 Claims, 11 Drawing Sheets

U.S. PATENT DOCUMENTS

| | | | |
|---|---|---|---|
| 2010/0168942 | A1 | 7/2010 | Noffsinger et al. |
| 2010/0174484 | A1* | 7/2010 | Sivasubramaniam et al. .................. 701/213 |
| 2010/0185471 | A1 | 7/2010 | Chen et al. |

FOREIGN PATENT DOCUMENTS

| | | |
|---|---|---|
| FR | 2760282 | 9/1998 |
| JP | 01187611 | 7/1989 |
| JP | 10307042 | 11/1998 |
| JP | 2007057499 | 3/2007 |
| WO | WO2004061737 | 7/2004 |
| WO | WO2004097341 | 11/2004 |

OTHER PUBLICATIONS

PCT International Search Report for PCT/US09/67375 dated Aug. 4, 2010.

USPTO Office Action for U.S. Appl. No. 12/355,152 dated Jun. 24, 2011.

USPTO office action for U.S. Appl. No. 11/735,831 dated Jun. 28, 2010.

Chen, "Weather Routing: a New Approach", Ocean Systems, Inc., pp. 1-5, retrieved Nov. 24, 2008 http:www.ocean-systems.com/papers.htm.

U.S. Appl. No. 12/355,152, filed Jan. 16, 2009, Chen et al.

Chen et al., "Use of Operation Support Information Technology to Increase Ship Safety and Efficiency", Transactions, vol. 106, 1998, pp. 105-127.

Teti et al., "Sun-Synchronous Lunar Polar Rover as a First Step to Return to the Moon", Proceedings ISAIRAS 2005 Conference, Munich, Germany, Sep. 2005, pp. 1-8 http://tlm.barfoot.googlepages.com/teti_isairas05.pdf.

Avnet et al., "Lunar Telescope Facility Final Design Report", MIT Aeronautics and Astronautics, 2007, 7 pages of table of contents with full article at: http://ocw.mit.edu/NR/rdonlyres/Aeronautics-and-Astronautics/16-89JSpring-2007/EOOC807D-5D9C-47EC-A8AF-019708EFD1CA/0/report.pdf.

"Mars Autonomy Project Path Planning", 1999, pp. 1-3 http://www.frc.ri.cmu.edu/projects/mars/dstar.html.

Bradley et al., "Preliminary Cocnepts for a long-range Mars Rover Navigation System Prototype based on a Mars Global Terrain Database", Research Report No: 2001-695-18, Department of Computer Science, University of Calgary, Calgary Canada, pp. 1-9 architecture:http://dspace.ucalgary.ca/bitstream/1880/46267/2/2001-695-18.pdf.

Team MCNAV, "DARPA Lunar Grand Challenge 2005—MBARS", MCNAV System & Software Architecture (SSA), Carnegie Mellon University, Jul. 2005, pp. 1-11.

Thrun et al., "Stanley: The Robot that Won the DARPA Grand Challenge", Journal of Field Robotics 23(9) pp. 661-692, 2006.

U.S. Appl. No. 11/735,831, filed Apr. 16, 2007, Bruce et al.

* cited by examiner

OPTIMAL VEHICLE ROUTER WITH ENERGY MANAGEMENT SYSTEM

BACKGROUND INFORMATION

1. Field

The present disclosure relates generally to vehicles and in particular to a method and apparatus for generating routes for a vehicle. Still more particularly, the present disclosure relates to a computer implemented method, apparatus, and computer usable program code for routing a rover with energy management.

2. Background

Future robotic and/or manned space exploration programs seek to place a rover on the moon to explore regions of scientific and commercial interest. A rover is a space exploration vehicle designed to move across the surface of a planet or other astronomical body. Rovers may be fully autonomous vehicles, partially autonomous vehicles, or fully under the control of a human operator. These regions may include, for example, areas with hydrogen concentration, water and polar regions, and areas with concentrations with helium-3. Rovers, in this type of environment, require near real time automated mission planning and support capability to plan routes across the lunar terrain.

A number of different factors are present with respect to the movement of a rover on a lunar surface. These characteristics include the impact of lunar terrain grade and surface material and the effect of the traction of the rover and energy consumption. Further, a need is present to maintain some level of solar exposure on the rover.

Solar exposure may be used by rovers with solar arrays for power cells to generate energy. This solar exposure also may be needed for thermal control of electronics and other devices. Another factor is a rover may need to maintain a line of sight communication with various nodes and may need to manage times in shadow regions where low temperatures may adversely impact rover performance.

Some routing tools are currently present for rovers. Jet Propulsion Laboratory (JPL) is a National Aeronautics and Space Administration (NASA) research center that has routing tools. Some of these tools use large-scale lunar information system (LIS) digital terrain database data for routing. This type of routing tool is specifically designed for small rovers, which may traverse over relatively short distances. The routing system by Jet Propulsion Laboratory is designed for a tactical, highly accurate exploration of a small area of terrain in which precision relocation is key to the movement of the rover. This type of routing process involves careful preplanning to accomplish these movements.

Other types of routing or navigation systems may use active optical systems, such as lasers, to detect obstacles in the path of the rover and re-route the rover on the fly. These types of solutions, however, are built for low-speed, short-distance rovers that typically use cameras to determine small-distance way points. These types of tools, however, do not overcome the different problems involved with moving rovers over longer distances.

Therefore, it would be advantageous to have a method, apparatus, and computer usable program code to overcome the problems discussed above, as well as possible other problems.

SUMMARY

In one advantageous embodiment, a method is present for generating a route for a vehicle. A start point and an end point are identified for the vehicle. A spatial model of terrain encompassing the start point and the end point is identified to form an identified spatial model. The route for the vehicle is generated from the start point to the end point using the spatial model based on a cost to traverse a grid point within a grid to meet a number of criteria for energy management for the vehicle.

In another advantageous embodiment, a method is present for generating a route for a rover. A start point and an end point are identified for the rover. A spatial model of terrain encompassing the start point and the end point is identified. The terrain comprises a gradient and a surface condition for a number of locations within the terrain. A plurality of energy levels is included within the spatial model as another dimension to form an identified spatial model. The route for the rover from the start point to the end point is generated using the identified spatial model based on a cost to traverse a grid point within a grid to meet a number of criteria for energy management for the vehicle. The route comprises a number of segments in which each segment is associated with an energy level from the plurality of energy levels.

In yet another advantageous embodiment, an apparatus comprises a computer and program code. Program code is present for a route generation process stored on the computer. The computer is capable of executing the program code to identify a start point and an end point for a rover, and identify a spatial model of terrain encompassing the start point and the end point. The terrain comprises a gradient and a surface condition for a number of locations within the terrain. The terrain includes a plurality of energy levels within the spatial model as another dimension to form the spatial model and generates the route for the rover from the start point to the end point using the spatial model based on a cost to traverse a grid point within a grid to meet a number of criteria for energy management for a vehicle. The route comprises a number of segments in which each segment is associated with an energy level from the plurality of energy levels.

In another advantageous embodiment, a computer program product for generating a route for a vehicle comprises a computer recordable storage medium and program code. The program code is stored on the computer recordable storage medium. Program code is present for identifying a start point and an end point for the vehicle. Program code is present for identifying a spatial model of terrain encompassing the start point and the end point to form an identified spatial model. Program code is also present for generating the route for the vehicle from the start point to the end point using the spatial model based on a cost to traverse a grid point within a grid to meet a number of criteria for energy management for the vehicle.

In still yet another advantageous embodiment, a computer program product for generating a route for a rover comprises a computer recordable storage medium and program code. The program code is stored on the computer recordable storage medium. Program code is present for identifying a start point and an end point for the rover. Program code is present for identifying a spatial model of terrain encompassing the start point and the end point. The terrain comprises a gradient and a surface condition for a number of locations within the terrain. Program code is present for including a plurality of energy levels within the spatial model as another dimension to form an identified spatial model. Program code is also present for generating the route for the rover from the start point to the end point using the identified spatial model based on a cost to traverse a grid point within a grid to meet a number of criteria for energy management for the vehicle. The route comprises a number of segments in which each segment is associated with an energy level from the plurality of energy levels.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
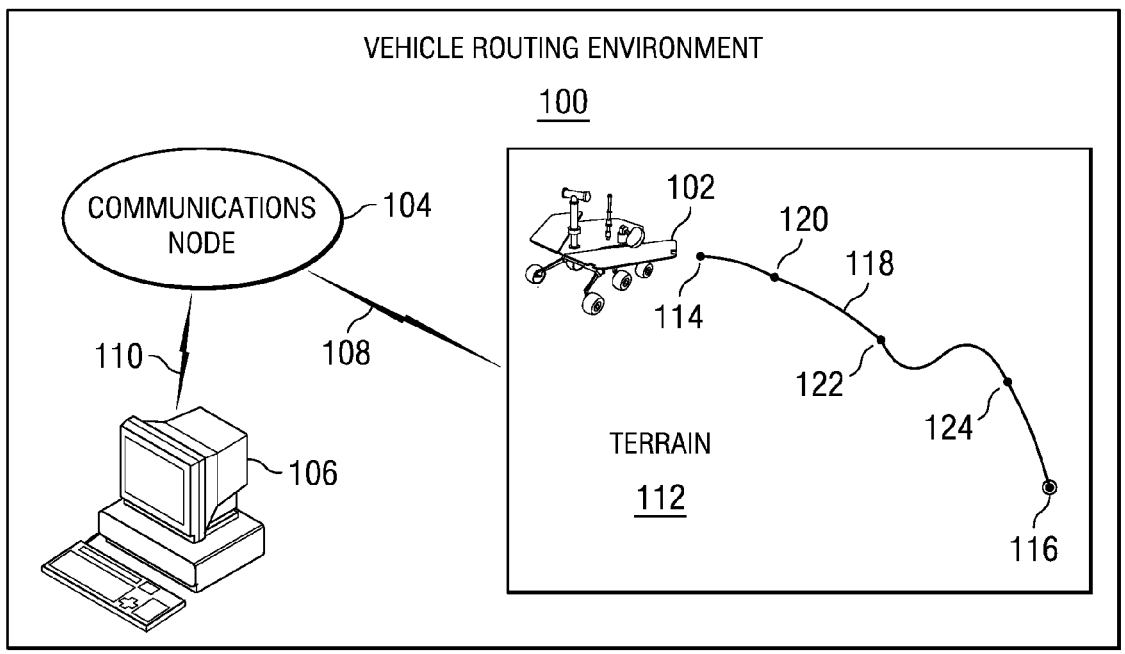
FIG. 1 is a diagram illustrating a vehicle routing environment in accordance with an advantageous embodiment.

With reference now to the figures, and in particular with reference to FIG. 1, a diagram illustrating a vehicle routing environment is depicted in accordance with an advantageous embodiment. Vehicle routing environment 100 includes vehicle 102, communications node 104, and computer 106. Vehicle 102 may communicate with communications node 104 through communications link 108. Computer 106 may communicate with communications node 104 through communications link 110. With these communications links, information may be transferred between vehicle 102, communications node 104, and computer 106.

In these illustrative examples, vehicle 102 is located on terrain 112. Vehicle 102 may take various forms. For example, vehicle 102 may be, without limitation, a lunar rover, a planetary rover, a land-based spacecraft, a tank, a personnel carrier, or some other mobile land-based platform. In these examples, terrain 112 may be located on a body such as, for example, without limitation, the moon, the earth, Mars, an asteroid, or some other suitable body.

Vehicle 102 may travel from start point 114 to end point 116. Vehicle 102 may travel from start point 114 to end point 116 through route 118. Route 118 also includes way points 120, 122, and 124 in these examples. A way point is an intermediate point along route 118 between start point 114 and end point 116.

Further, vehicle 102 may communicate with communications node 104 and/or computer 106 during movement on route 118. The planning of route 118 may be performed through various data processing systems that may be located on vehicle 102, in communications node 104, and/or in computer 106. Communications node 104 may be, for example, a satellite, a spacecraft, or a building or other vehicle located on terrain 112. Further, computer 106 may be located on a spacecraft, a satellite, or on another planetary body. For example, if terrain 112 is located on the moon, computer 106 may be located on the earth.

The different advantageous embodiments recognize that existing routing solutions or processes are built for low-speed rovers that typically use cameras to identify small way points. Although these types of systems may take into account terrain data, they are not designed for long-distance routes at speeds for exploring or travelling over longer distances. Further, the different advantageous embodiments recognize that currently available routing systems do not optimize energy management.

The different advantageous embodiments recognize that currently available systems are more optically oriented to provide near-range object avoidance. The different advantageous embodiments recognize that these currently available systems do not take into account the terrain beyond obstacle avoidance. In particular, the different advantageous embodiments recognize that the currently available systems do not take into account factors or issues that may come up with respect to longer range routes.

For example, the different advantageous embodiments recognize that currently used systems do not take into account various factors of the terrain such as, for example, side slope, forward slope, and surface conditions. Also, other conditions, such as illumination of a rover by solar exposure, are not taken into account by currently used routing systems.

Thus, in a manner that takes into account terrain and other factors, the different advantageous embodiments provide a capability to route vehicle 102 from start point 114 to end point 116 including way points 120, 122, and 124. Route 118 may be generated in a manner that meets various parameters to reach end point 116. For example, these parameters may include constraints regarding the terrain and energy management.

In these advantageous embodiments, a method, apparatus, and computer program code is present for generating a route for a vehicle, such as vehicle 102. A start point and an end point are identified for the vehicle. A spatial model of terrain encompassing the start point and the end point is identified to form an identified spatial model. A route is generated for the vehicle from the start point to the end point using the identified spatial model and based on a cost to traverse a grid point within a grid in the spatial model to meet a number of criteria for energy management of the vehicle.

In these different advantageous embodiments, when terrain 112 takes the form of terrain on a body such as, for example, the moon, the routing of vehicle 102 may be performed using a model of terrain 112, energy consumption by vehicle 102, solar energy replenishment, and a program that may perform routing using Dijkstra's algorithm with an expanded third dimension to take into account energy management and usage. Dijkstra's algorithm is a search algorithm that finds a single shortest path. This type of process, as well as other routing processes, may be used to generate route 118 in accordance with an advantageous embodiment.

In one or more of the different advantageous embodiments, the various routing processes may be located within vehicle 102, communications node 104, computer 106, and/or some other suitable device or object. This routing process may be distributed among different components or located in a single component.

The illustration of vehicle routing environment 100 in FIG. 1 is not meant to imply physical or architectural limitations to the manner in which a vehicle routing environment may be implemented. In other advantageous embodiments, vehicle routing environment 100 may include other components in addition to or in place of the ones illustrated in FIG. 1. For example, additional communication nodes may be present in addition to communications node 104. In some advantageous embodiments, computer 106 may be absent. In yet other advantageous embodiments, additional rovers may be present for which routing is performed to route those vehicles between start and end points on terrain 112.

Figure 2:
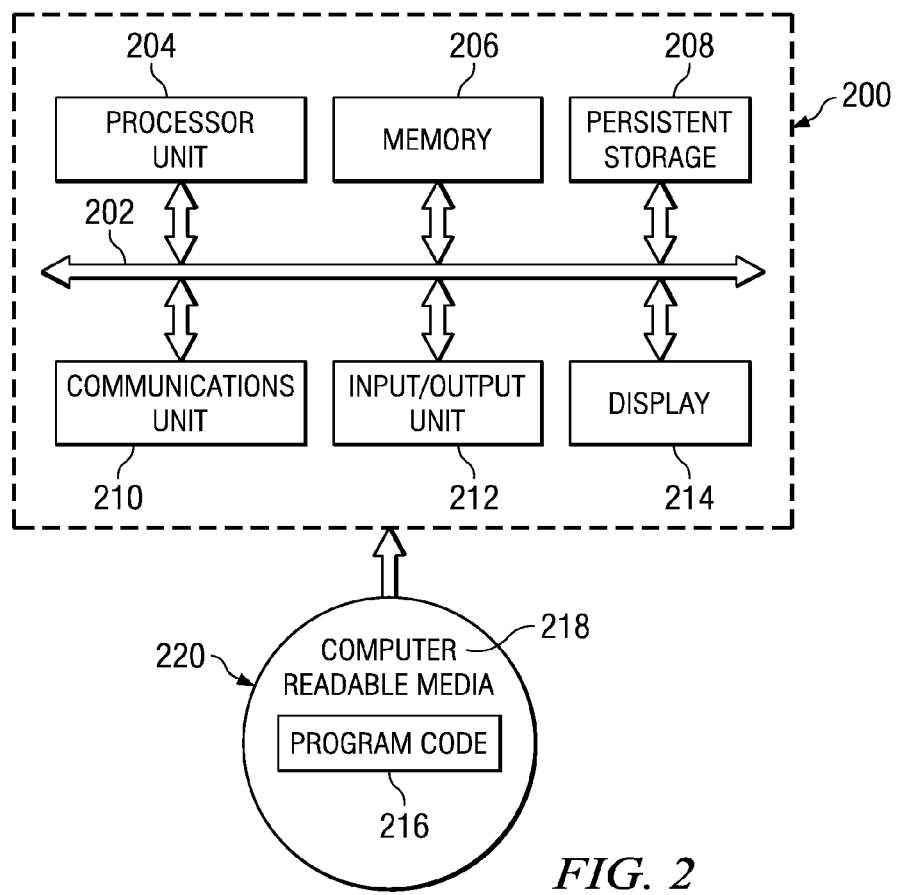
FIG. 2 is a diagram of a data processing system in accordance with an illustrative embodiment.

Turning now to FIG. 2, a diagram of a data processing system is depicted in accordance with an illustrative embodiment. Data processing system 200 is an illustrative example of a data processing system in which routing processes may be implemented. Data processing system 200 may be located in various components such as, for example, without limitation, vehicle 102, communications node 104, and computer 106 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory, that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200.

Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as one found in an interface and memory controller hub that may be present in communications fabric 202.

Figure 3:
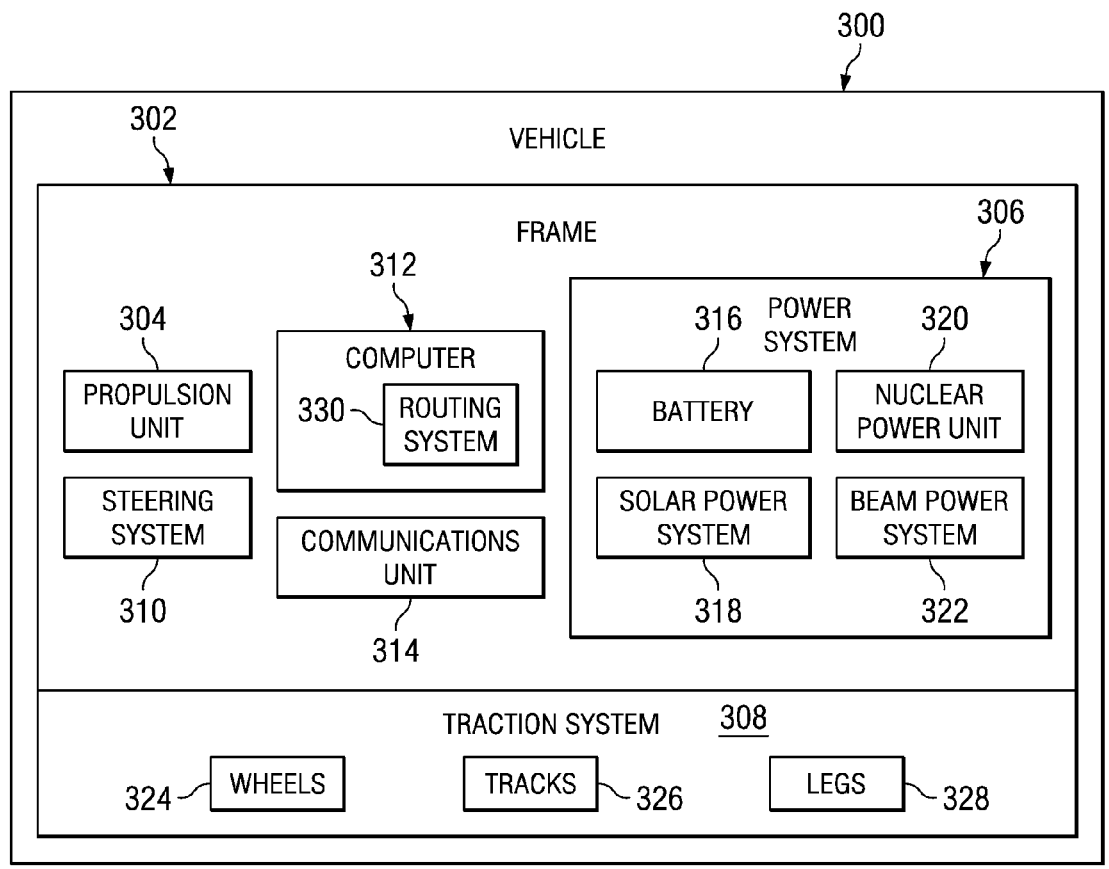
FIG. 3 is a diagram of a vehicle in accordance with an advantageous embodiment.

With reference now to FIG. 3, a diagram of a vehicle is depicted in accordance with an advantageous embodiment. In this example, vehicle 300 is an example of vehicle 102 in FIG. 1. Vehicle 300 includes frame 302, propulsion unit 304, power system 306, traction system 308, steering system 310, computer 312, and communications unit 314.

Frame 302 forms the structure around which various components may be placed and/or attached for vehicle 300. Propulsion unit 304 provides the engine and/or power plant to move vehicle 300. Propulsion unit 304 provides the capability to generate mechanical energy to power traction system 308.

Power system 306 provides the power to propulsion unit 304 used to generate the mechanical energy. Power system 306 also provides energy to power various components for vehicle 300. These components include, for example, without limitation, steering system 310, computer 312, communications unit 314, and any other suitable components that may require power. In these examples, power system 306 may take various forms.

Power system 306, in these examples, contains at least one of battery 316, solar power system 318, nuclear power unit 320, beam power system 322, and any other suitable power system. As used herein, the phrase "at least one of", when used with a list of items, means that different combinations of one or more of the items may be used, and only one of each item in the list may be needed. For example, "at least one of item A, item B, and item C" may include, without limitation, item A, or item A and item B. This example also may include item A, item B, and item C; or item B and item C.

Battery 316 may store energy for use by propulsion unit 304, as well as providing power to other components. Solar power system 318 may generate power for use by various components within vehicle 300 in response to being illuminated through solar exposure. Further, solar power system 318 also may generate energy that is stored within battery 316.

Nuclear power unit 320 can provide an independent source of energy that does not rely on exterior environmental factors, such as illumination from solar exposure. Beam power system 322 may receive energy in the form of microwave and/or laser beams. For example, beam power system 322 may receive a microwave or laser beam from a satellite or other source. This energy may then be turned into electrical power for storage in battery 316.

Traction system 308 provides the capability to move vehicle 300 over different types of terrain. Traction system 308 may take various forms. For example, without limitation, traction system 308 may include wheels 324, tracks 326, and/or legs 328. Steering system 310 provides a capability to steer or change the direction of vehicle 300 during movement.

Computer 312, in these examples, executes various processes for operating vehicle 300. These processes may include, for example, obtaining data and/or performing routing. Routing may be performed using routing system 330 in these examples. Routing system 330 provides a capability to generate routes for vehicle 300. Routing system 330 may be a number of different software components. A number, as used herein, refers to one or more items. For example, a number of components is one or more components.

Routing system 330 may generate a route from a start point to an end point that meets various parameters. These parameters include, for example, total trip time, required line of sight to a communications node, energy usage, speed, and other suitable factors.

Communications unit 314 may provide a capability to exchange information with other objects, such as communication nodes, computers, rovers, spacecraft, and/or other suitable objects. In various implementations, communications unit 314 may require a line of sight. Communications unit 314 may use various mechanisms such as, for example, microwave transmissions and/or laser beam transmissions to exchange information.

The illustration of vehicle 300 in FIG. 3 is not meant to imply physical or architectural limitations to the manner in which various vehicles may be implemented. For example, vehicle 300 may include components in addition to or in place of the ones illustrated. As one example, in some advantageous embodiments, vehicle 300 also may include instruments to obtain information about the terrain and environment around the vehicle. In yet other advantageous embodiments, vehicle 300 also may include a cargo area to carry cargo.

In different advantageous embodiments, vehicle 300 may be completely autonomous, partially autonomous, or a manned vehicle. In yet other advantageous embodiments, routing system 330 may be located on another component such as, for example, a remote computer. With this type of embodiment, vehicle 300 receives routes through communications unit 314 and executes the route using computer 312.

In other advantageous embodiments, vehicle 300 may include battery 316 and solar power system 318 as the components for power system 306. In still other advantageous embodiments, vehicle 300 may include beam power system 322 and battery 316. In still other advantageous embodiments, power system 306 may include battery 316, solar power system 318, and beam power system 322.

Figure 4:
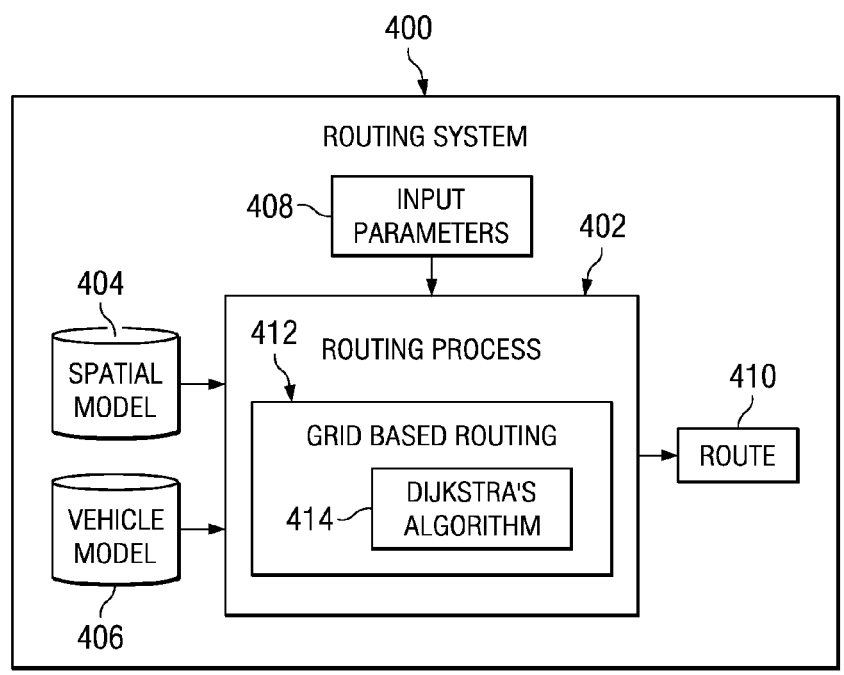
FIG. 4 is a diagram of a routing system in accordance with an advantageous embodiment.

With reference now to FIG. 4, a diagram of a routing system is depicted in accordance with an advantageous embodiment. Routing system 400 is a more detailed example of an implementation of routing system 330 in FIG. 3.

Routing system 400 includes routing process 402, spatial model 404, and vehicle model 406. In these examples, routing process 402 may receive input parameters 408 to generate route 410 using spatial model 404 and vehicle model 406.

In these examples, spatial model 404 is a model of the terrain over which the vehicle is to travel. Spatial model 404 may be derived from a digital elevation model (DEM) or any other model providing information about terrain. In a third dimension, spatial model 404 may also contain information about illumination and other suitable factors. Spatial model 404 also includes an additional dimension for energy management. This additional dimension tracks the amount of energy or energy levels for the vehicle. Vehicle model 406 is a model that is specific for the vehicle being routed.

In routing system 400, vehicle model 406 provides an identification of information used by routing process 402. This information includes, for example, speed, energy usage, and other suitable information. Vehicle model 406 may generate this information based on the location of the vehicle within spatial model 404. For example, terrain and illumination identified in spatial model 404 may be used to identify the energy usage, energy creation, and/or energy storage for vehicle model 406.

Input parameters 408 may be input by an operator, obtained from a file, and/or received from some other source. In the illustrative examples, input parameters 408 include information such as, for example, a start point, an end point, a total trip time, a minimum speed required, a maximum speed, and/or some other suitable parameter.

These parameters may include those for a particular mission. For example, a particular mission may involve carrying perishable items that may require delivery of the items to the end point by a certain total trip time. With this example, input parameters 408 may include a start point, an end point, and a total trip time.

In these examples, routing process 402 includes grid based routing 412. Specifically, Dijkstra's algorithm 414 may be used within grid based routing 412 in routing process 402 to move from a start point to an end point such as, for example, start point 114 and end point 116 in FIG. 1.

The illustration of routing system 400 is not meant to imply architectural limitations to the manner in which different routing processes may be implemented. For example, routing system 400 may include other components in addition to or in place of the ones illustrated. As an illustrative example, routing system 400 may include a user interface to receive input parameters 408. In other advantageous embodiments, Dijkstra's algorithm 414 may not be used, and some other routing process may be employed within grid based routing 412.

In yet other advantageous embodiments, routing system 400 may be distributed in different locations. For example, routing process 402 may be located in one location, while spatial model 404 and vehicle model 406 may be located in other locations. In yet other advantageous embodiments, spatial model 404 and vehicle model 406 may be combined into a single model. Further, in other advantageous embodiments, other vehicle models may be present in addition to vehicle model 406 to provide models for other types of vehicles. This type of implementation allows routing system 400 to provide routes, such as route 410, to multiple types of vehicles.

In other advantageous embodiments, additional spatial models may be present in addition to spatial model 404 for other locations on a planetary body or other bodies of interest on which routes may be generated. Further, spatial model 404 may be a dynamic model, which is updated as data or observations are received with respect to the terrain modeled by spatial model 404.

Figure 5:
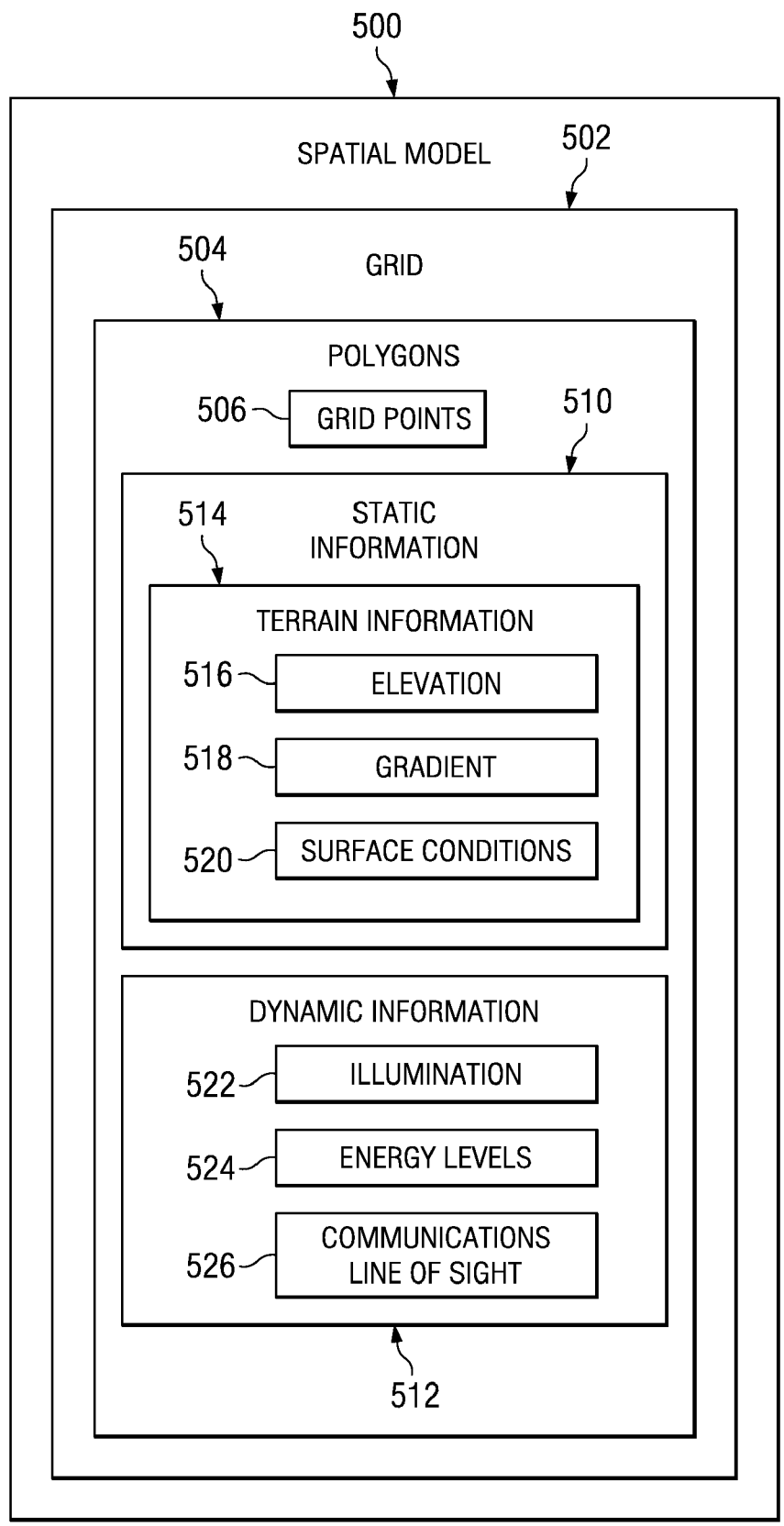
FIG. 5 is a block diagram of a spatial model in accordance with an advantageous embodiment.

With reference now to FIG. 5, a block diagram of a spatial model is depicted in accordance with an advantageous embodiment. In this example, spatial model 500 is an example of spatial model 404 in FIG. 4. Spatial model 500 is used to generate a route over the terrain modeled by spatial model 404 in FIG. 4.

Spatial model 500 includes grid 502. Grid 502 contains polygons 504. Polygons 504 are arranged in a way that interconnects each other to form grid 502. Polygons 504 have grid points 506. A grid point is a point at the center or at a central location within a polygon. In these examples, the polygons may take the form of squares. In other advantageous embodiments, polygons 504 may be, for example, hexagons, octagons, or some other suitable polygonal shape.

Polygons 504 contain information. Each polygon within polygons 504 contains information such as, for example, without limitation, static information 510 and dynamic information 512. Static information 510 may include, for example, terrain information 514. Terrain information 514 may include, for example, elevation 516, gradient 518, surface conditions 520, and other suitable information about the terrain. Dynamic information 512 may include illumination 522, energy levels 524, and communications line of sight 526. This information may be used to route a vehicle.

Further, grid 502 may have a third dimension. In this third dimension, each grid point has multiple levels that may be used for energy management. In the different advantageous embodiments, different levels within a grid point are associated with energy levels 524. An energy level may represent the energy present in a vehicle. This energy may be continuously generated by a nuclear power unit. In other advantageous embodiments, this energy level may be identified based on energy generated by solar panels and energy stored in a battery. The energy level may be identified from a vehicle model in these examples.

The illustration of spatial model 500 in FIG. 5 is not meant to imply architectural limitations to the manner in which spatial model 500 may be implemented. For example, spatial model 500 may include other components in addition to or in place of the ones illustrated in FIG. 5.

For example, spatial model 500 may not include illumination 522, depending on the type of vehicle. For example, if a vehicle using a nuclear power unit is present, illumination 522 may not be relevant depending on the thermal properties of the vehicle. In other advantageous embodiments, additional information about ice, foliage, or other suitable information about the terrain may be present.

Figure 6:
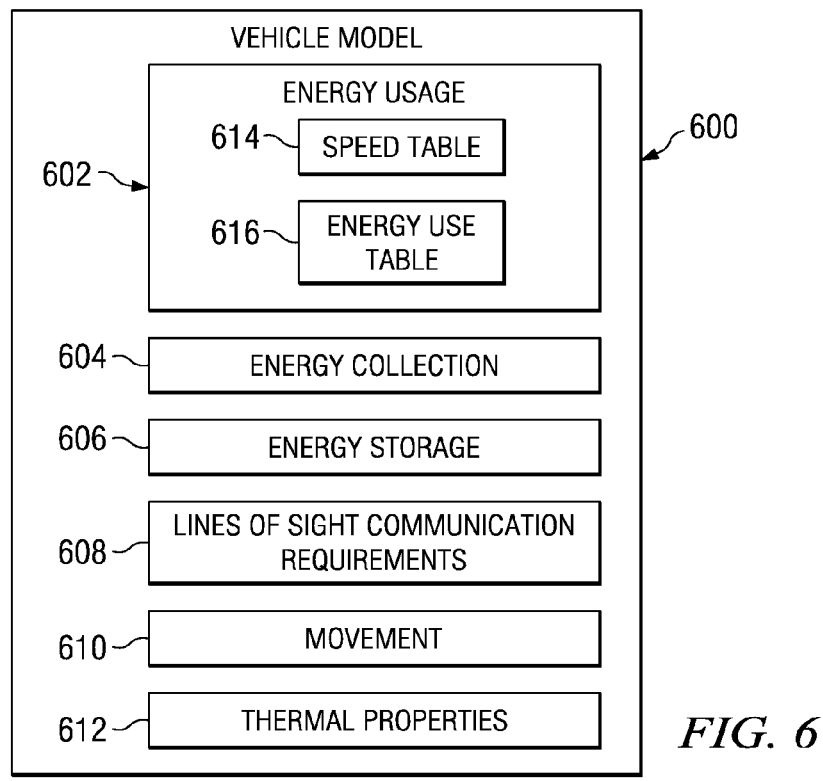
FIG. 6 is a diagram of a vehicle model in accordance with an advantageous embodiment.

With reference now to FIG. 6, a diagram of a vehicle model is depicted in accordance with an advantageous embodiment. In this example, vehicle model 600 is an example of one implementation for vehicle model 406 in FIG. 4. Vehicle model 600 provides a capability to identify responses of a particular vehicle to various operations and environmental factors.

These responses are used in identifying a cost for the vehicle to travel over terrain as described in spatial model 500 in FIG. 5. Vehicle model 600 includes energy usage 602, energy collection 604, energy storage 606, lines of sight communication requirements 608, movement 610, and thermal properties 612.

In these examples, energy usage 602 may include speed table 614 and energy use table 616. Energy usage 602 may be used to model the energy used by vehicle model 600. For example, the energy usage may be a function of terrain. The terrain information is obtained from spatial model 500 in FIG. 5 in these illustrative examples.

This terrain may include, for example, gradient and surface conditions. The interaction of the vehicle with the gradient may result in a forward slope and/or side slope. The energy usage of a vehicle may vary depending on the terrain. This type of function may identify the amount of energy used, depending on the type of terrain for use in calculating costs and identifying a route for the vehicle.

Energy collection 604 may be used to identify the energy generation rate for a particular type of energy system for the vehicle. For example, with a nuclear power unit, the energy generation rate may be a function of time. With a solar cell system, the energy collection may be based on the specifications for the particular solar panel and the amount of illumination. Additionally, energy collection 604 may take into account other types of energy collection such as, for example, regenerative breaks that may recharge a battery.

Energy storage 606 may provide information about the battery used by the vehicle. This information may include capacity, recharge rate, efficiency, and other suitable information.

Lines of sight communication requirements 608 may identify the type of lines of sight requirements needed for vehicle model 600. This information may be used by the routing process to identify routes that maintain the required line of sight communication requirements.

Movement 610 may be used to obtain information about the movement of a vehicle over terrain. Movement 610 may identify the speed of the vehicle as a function of forward slope and side slope. Further, movement 610 also may identify limits to the maximum forward and side slopes that may be traversed by a particular vehicle. This type of modeling may identify limits to the headings of a vehicle. Movement 610 may provide, for example, the speed of a vehicle based on terrain condition such as, for example, forward slope, side slope, and surface conditions. This terrain information may be used in conjunction with the energy collected or stored by the vehicle.

Thermal properties 612 may identify the thermal properties of various devices or components for the vehicle. Thermal properties 612 may be used to identify factors such as, for example, temperatures at which a component fails, a temperature at which a component of the vehicle becomes unreliable, the rate at which a temperature changes for a component based on illumination on the vehicle, and other suitable information.

The illustration of models, such as spatial model 500 in FIG. 5 and vehicle model 600 in FIG. 6, is not meant to imply architectural limitations to the manner in which different types of models may be implemented. Other models may include other components in addition to or in place of the ones illustrated.

For example, spatial model 500 in FIG. 5 also may include a description or information about foliage, ice, or other features that may be present in the terrain. As another example, vehicle model 600 in FIG. 6 also may include models such as emission generation, heat generation, or other models to generate suitable information.

Figure 7:
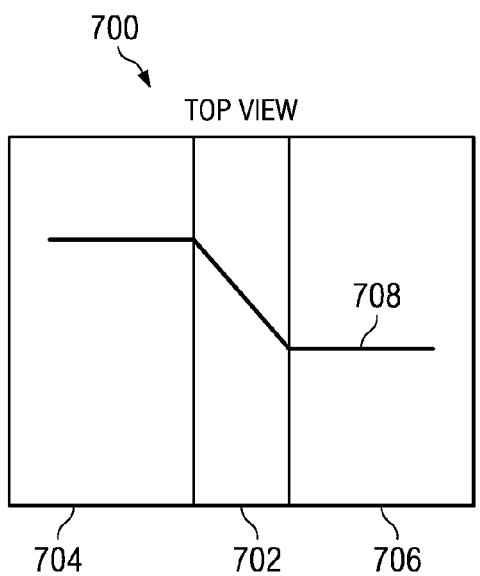
FIG. 7 is a diagram of a terrain in accordance with an advantageous embodiment.

With reference now to FIG. 7, a diagram of a terrain is depicted in accordance with an advantageous embodiment. Terrain 700 is an example of a terrain that may be found in a grid such as, for example, grid 502 in FIG. 5. Terrain 700 may be divided up into multiple squares to form a grid.

In this example, terrain 700 has slope 702, in which section 704 of terrain 700 is lower than section 706 in terrain 700. In this example, path 708 may be angled in slope 702 rather than proceeding in a straight line up slope 702.

This type of path may be generated because of constraints for side slope and forward slope for a vehicle as defined in the vehicle model. Moving straight up slope 702 exceeds a forward slope constraint for the vehicle. By going up slope 702 diagonally, both the forward slope and side slope constraints for the vehicle, as defined in the vehicle model, may be met.

Figure 8:
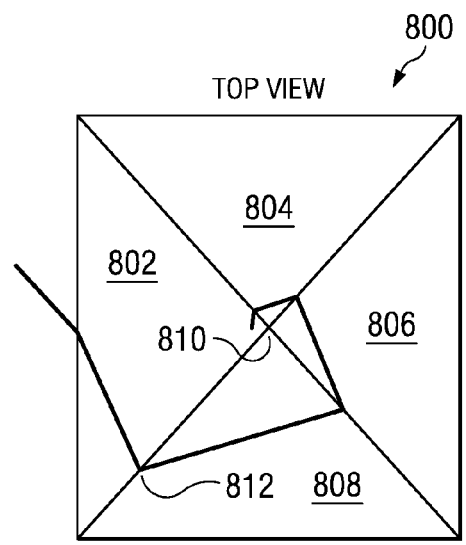
FIG. 8 is a diagram of a terrain in accordance with an advantageous embodiment.

With reference now to FIG. 8, a diagram of a terrain is depicted in accordance with an advantageous embodiment. In this example, terrain 800 is an example of a terrain that may be found within grid 502 in FIG. 5. Terrain 800 also may be divided up into grid squares for routing purposes.

Terrain 800 has features that form a pyramid shape, as can be seen by sections 802, 804, 806, and 808. These sections slope upward towards point 810 in this example. This type of terrain may be too steep for a rover to climb on a particular side. The terrain may be climbed to around point 810 using path 812.

The solutions illustrated in FIGS. 7 and 8 may not be achievable using currently available routing tools. The different advantageous embodiments provide a capability to identify additional points to meet various constraints based on vehicle models for climbing slopes. Terrain such as, for example, terrain 700 in FIG. 7 and terrain 800 in FIG. 8, may be divided up into a grid, such as grid 502 in FIG. 5, for purposes of generating routes.

Figure 9:
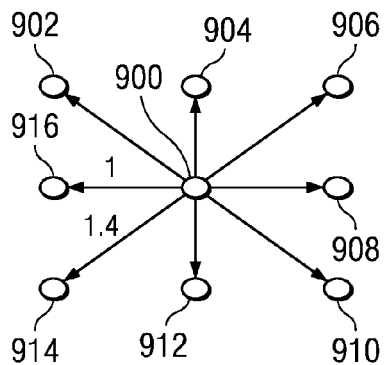
FIG. 9 is a diagram illustrating headings commensurate with a state of the art routing process that may be selected using a vehicle in accordance with an advantageous embodiment.

Turning now to FIG. 9, a diagram illustrating headings that may be selected using a routing process for a vehicle is depicted in accordance with an advantageous embodiment. Grid point 900 is an example of a grid point within grid points 506 in grid 502 in FIG. 5.

In this example, grid point 900 is the current location of the vehicle. Grid points 902, 904, 906, 908, 910, 912, 914, and 916 are neighboring grid points to grid point 900. In these examples, a grid point is the center of a grid square. Routing of a vehicle may be through different grid squares in these examples. These grid points represent possible headings for the vehicle from grid point 900.

In the advantageous embodiments, a routing process employs Dijkstra's algorithm to identify the appropriate point using a spatial model, a vehicle model, and various input parameters. In this example, there are only eight neighbors. State of the art approaches only traverse to the nearest eight neighboring grid points. Limiting traversals to the nearest eight neighbors produces limitations in route feasibility and route quality.

Figure 10:
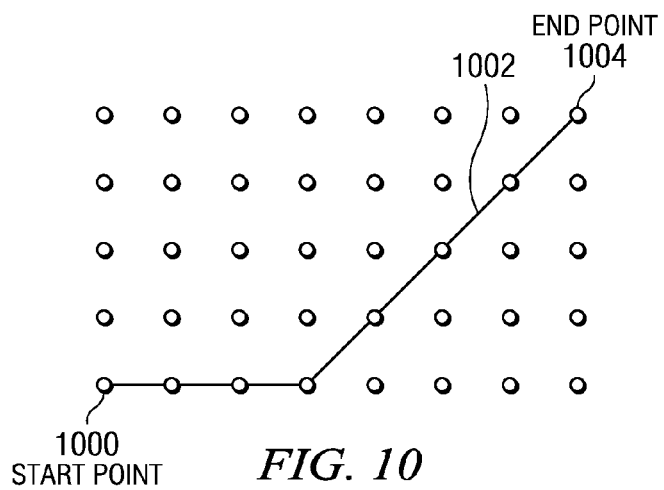
FIG. 10 is an illustration of a route from a start point to an end point for a vehicle using a state of the art routing process in accordance with an advantageous embodiment.

Turning now to FIG. 10, an illustration of a route from a start point to an end point for a vehicle using a routing process is depicted in accordance with an advantageous embodiment. In this example, the vehicle begins at start point 1000 and follows route 1002 to end point 1004. Route 1002 is generated using Dijkstra's algorithm with a process that takes into account the terrain over which the vehicle travels as well as other parameters. These other parameters may be, for example, without limitation, a maximum trip time, line of sight requirements, illumination requirements, and other suitable parameters that may be input.

The different advantageous embodiments recognize that routing a vehicle over surfaces may be highly heading dependent. Vehicle performance can be driven or constrained by forward slope and side slope. Forward slope and side slope are a function of the vehicle's heading relative to the terrain gradient. The speed of a vehicle and energy consumption may be identified as a function of terrain information, such as forward slope and side slope.

Further, limits may be present to the maximum forward slope and side slope that may be traversed by a vehicle. The different advantageous embodiments recognize, with these and other constraints, that limiting the number of possible headings may preclude feasible or usable solutions to generate a route.

The example in FIG. 10 is a simple example of an implementation of a routing process to identify an optimum route. The different advantageous embodiments recognize that, in many cases, a simple implementation of Dijkstra's algorithm may have fewer headings, such as four neighbors.

An implementation in which the headings are restricted to the nearest four or eight neighbors may result in the route to follow a stair-step pattern which may not be the best route for the vehicle. In FIG. 10, the number of headings is limited to eight. The best route may travel a straight line between grid point 1000 and grid point 1004. The shown route, generated with the eight heading limitation, cannot travel a straight line between the two grid points.

For example, the different advantageous embodiments recognize that in an extreme example over a flat lunar terrain, the optimal path between two points is a straight line. Problems may be caused by a grid from a limited number of neighbor points. The different embodiments recognize that identifying a route or path for a vehicle may be made easier as the number of possible headings from a point increases.

Although these types of headings may be employed using the different conditions described above, routing to meet the conditions may be made more difficult. Thus, the different advantageous embodiments may provide additional headings through a specified minimum angular maneuver resolution level. This level may act as a control to set the maximum number of nearest neighbor grid points that may be used to identify a solution in generating a route. Thus, the different illustrative embodiments include an ability to use additional headings in generating routes.

Figure 11:
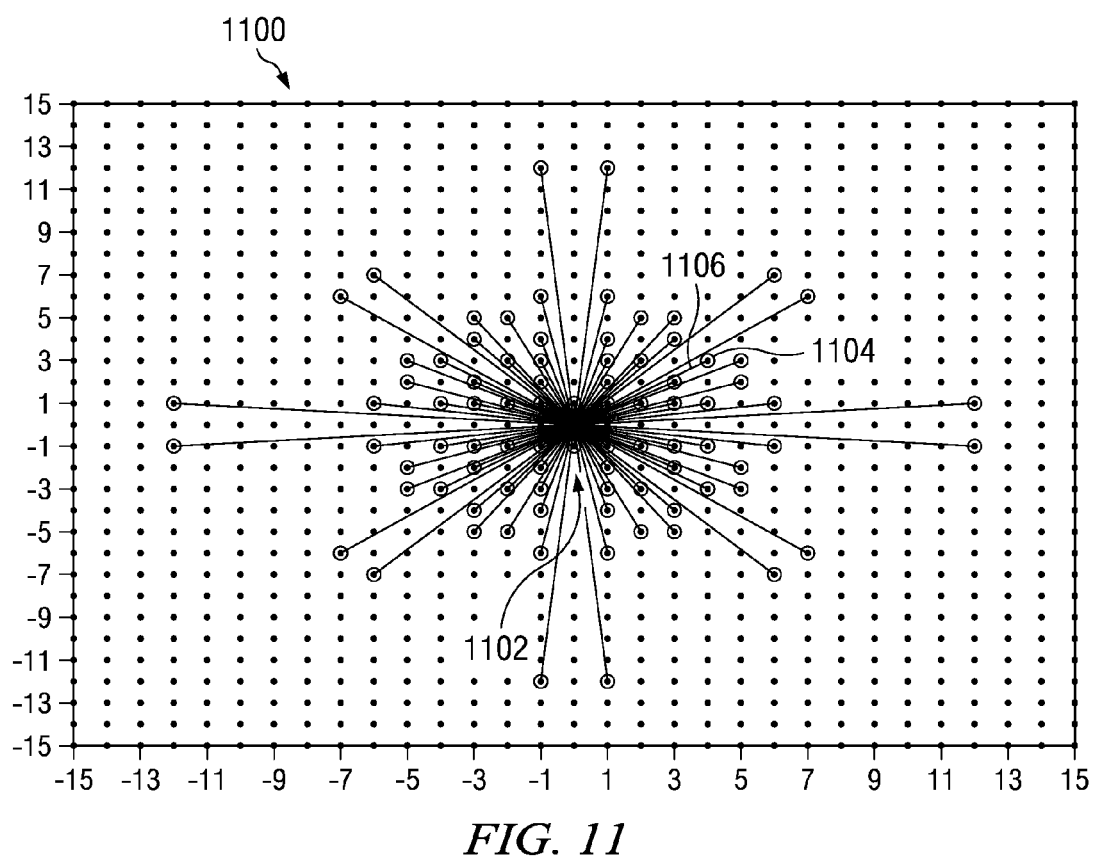
FIG. 11 is a diagram illustrating minimum angular resolution for use in a routing process in accordance with an advantageous embodiment.

With reference now to FIG. 11, a diagram illustrating minimum angular resolution for use in a routing process is depicted in accordance with an advantageous embodiment. In this example, graph 1100 illustrates a five degree minimum angular resolution in which more than eight adjacent nodes may be considered for the next possible heading of a vehicle at point 1102.

As can be seen, in addition to the eight adjacent grid points, additional grid points farther out from point 1102 also may be considered in identifying a path to another point. This system allows the routing process to consider all of the nearest neighbor grid points such that the minimum angular separation between any two grid points is no greater than five degrees in this example.

The illustration in FIG. 11 is a simplified illustration. The selection of neighbor grid points involves more than using all grid points within a given radius in the illustrative examples. Processing all neighbor grid points within a radius results in additional calculations that are not necessary.

The different illustrative embodiments may reduce the number of calculations by selecting neighbor grid points in a manner that the number of grid points in the set is minimized. Further, the selection of the neighbor grid points from point 1102 is minimized, subject to the difference between adjacent headings falling below a given maximum.

In these examples, for headings next to the axis or next to 45 degrees off an axis, a neighbor grid point is far away relative to other grid points. In these examples, these types of neighbor grid points are 12 grid squares away. The set of neighbor grid points do not include all the grid points within the radius of 12 of point 1102 in these examples.

Most of the grid points within the radius are not included in this set to reduce the number of calculations made. Headings on the axis or 45 degrees off of an axis only update the nearest neighbor grid point. Updating other neighbor grid points along the line is considered redundant in these examples. As a result, those grid points are not included in the illustrative embodiments.

In selecting a neighbor point, such as point 1104, a vehicle will travel from point 1102 to point 1104 through path 1106. This path takes the vehicle through a number of different grid points. The routing process traverses the sequence of grid squares along the path to determine the cost for traveling between the permanently labeled grid point and the neighbor.

The neighbor's label may be updated with the resulting cost. The points on the path to get to the neighbor do not have their labels updated. A pattern of neighbor points are produced around a permanently labeled grid point. The routing process determines the cost associated with traversing each path and updates the label for the last point on the path.

Figure 12:
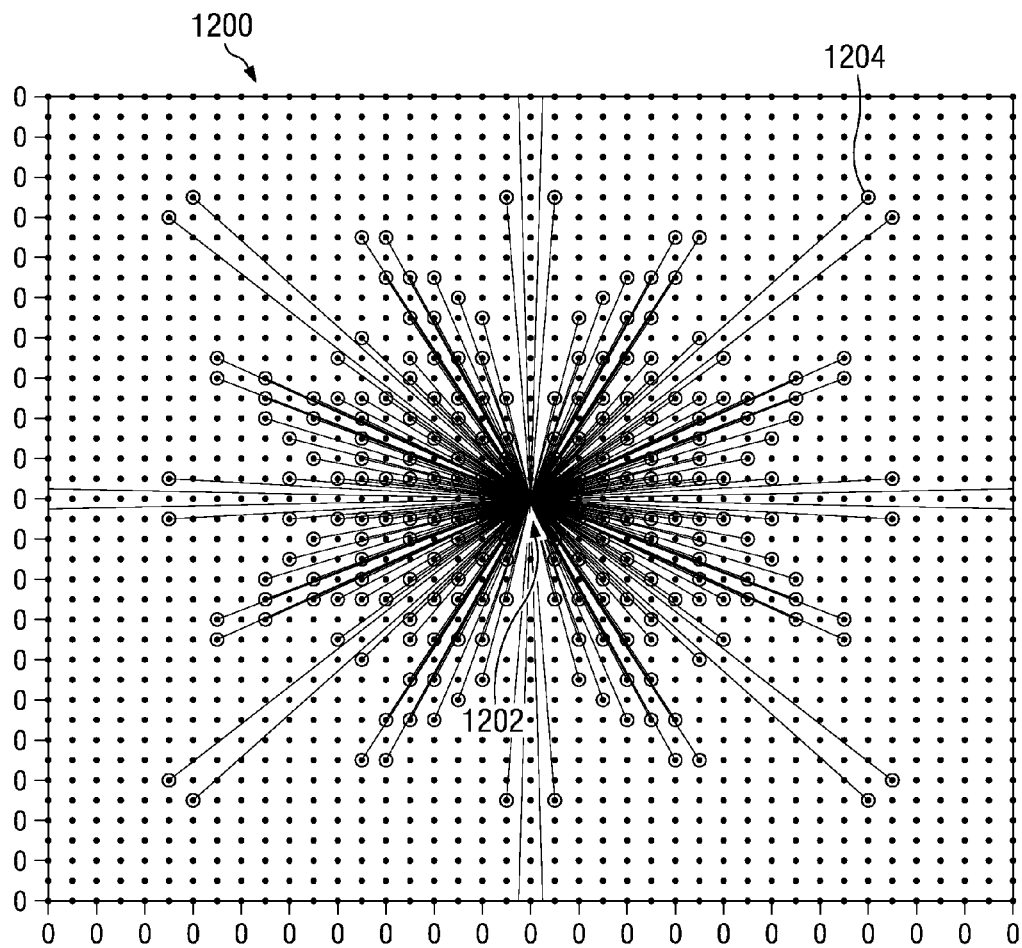
FIG. 12 is a diagram illustrating angular resolution in a neighborhood of around two degrees in accordance with an advantageous embodiment.

With reference now to FIG. 12, a diagram illustrating angular resolution in a neighborhood of around two degrees is depicted in accordance with an advantageous embodiment. In this example, graph 1200 illustrates an even higher number of headings with a finer angular resolution. With this type of resolution, a path identified as having the least cost from point 1202 to point 1204 may be a straight line.

Figure 13:
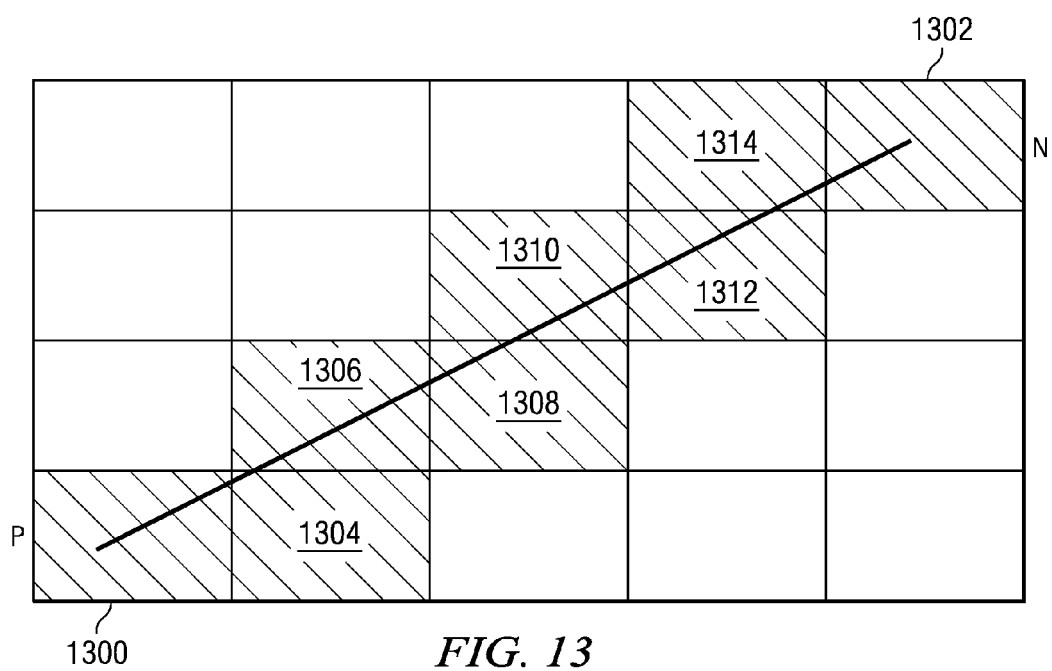
FIG. 13 is a diagram illustrating a path from the permanently labeled point to a neighboring point in accordance with an advantageous embodiment.

Turning now to FIG. 13, a diagram illustrating a path from the permanently labeled point to a neighboring point is depicted in accordance with an advantageous embodiment. In this example, path 1106 from FIG. 11 crosses a sequence of grid squares in which the centers of different points are present.

For example, point 1102 from FIG. 11 is the center of grid square 1300, while point 1104 from FIG. 11 is the center of grid square 1302. Path 1106 from FIG. 11 also travels through grid squares 1304, 1306, 1308, 1310, 1312 and 1314 to reach grid square 1302. As each grid square is crossed, the algorithm calculates the cost. The path crosses a small part of grid square 1304 and a larger part of grid square 1306. Assuming similar terrain conditions, the cost of traversing grid square 1304 will generally be lower than the cost of traversing grid square 1306.

Figure 14:
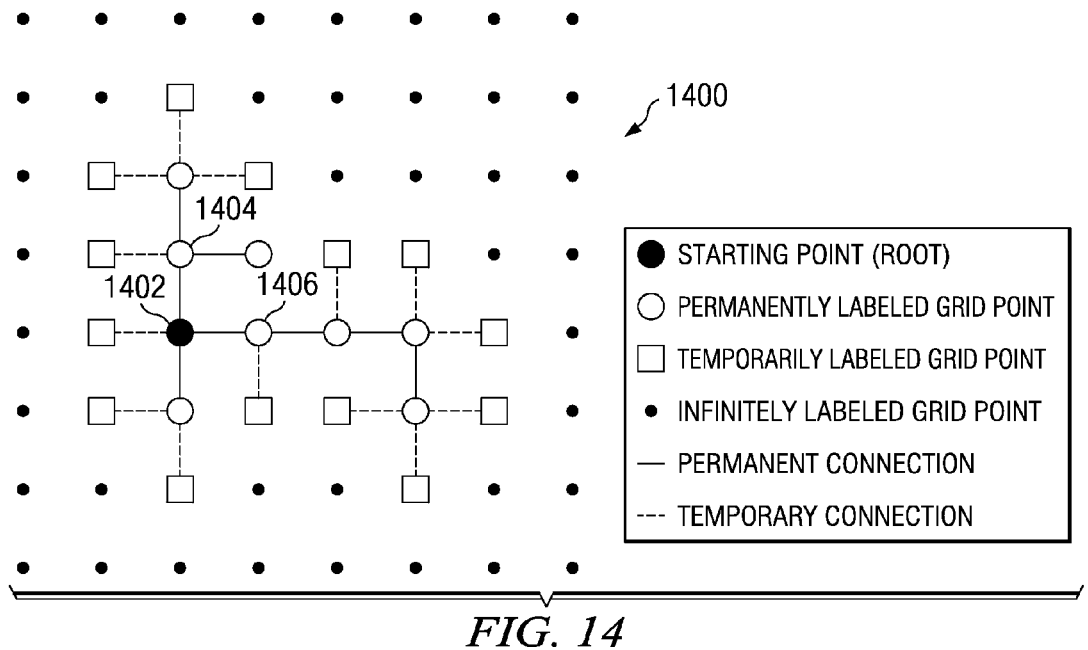
FIG. 14 is a diagram illustrating a grid network generated by a routing process in accordance with an advantageous embodiment.

Turning now to FIG. 14, a diagram illustrating a grid network generated by a routing process is depicted in accordance with an advantageous embodiment. To simplify this illustration, only four headings are used. Grid 1400 is an example of one implementation of grid 502 in FIG. 5. In this example, grid 1400 contains points in a network created through the use of Dijkstra's algorithm used to find the best route between two points. Although a straight line is the shortest path from a start point to an end point, other factors may result in the generation of a route that is not a straight line.

In these examples, the best route is the route that has the minimum cost to traverse from the start point to the end point. In the illustrative embodiments, Dijkstra's algorithm is employed to label each point within grid 1400 with a total cost of the currently known best route that points from the start point.

In processing grid 1400, the grid is initialized so that all points have a label of infinity as an initial label. The different points in grid 1400 are analogous to or represent points such as those found in FIGS. 10 and 11.

A start point is identified and given a permanent label of zero. In this example, the start point is current permanent point 1402. The start point becomes the current permanent point. For each non-permanently labeled neighbor grid point of current permanent point 1402, that neighbor grid point is processed to determine the total cost of reaching that neighbor grid point from current permanent point 1402. This total cost is the current label value of the current permanent point plus the cost of traversing from the current permanent point to the neighbor grid point.

If the total cost is less than the current label set for the neighbor grid point, the current label is set to the new total cost and a connection is generated to the current permanent point. For example, grid point 1404 and grid point 1406 are connected to current permanent point 1402.

After this identification has been made for all the neighbor grid points to current permanent point 1402, the non-permanently labeled grid point with the smallest label is identified. The label on this point is made permanent. This grid point is now the new current permanent point, and processing begins again for all of the neighbor points to this new start point. For example, if grid point 1406 is identified as having the smallest label, this grid point is now identified as the current permanent point, and the process begins again for all the points surrounding grid point 1406.

In these examples, a cost to move a vehicle within a grid, such as grid 502 in FIG. 5, is identified in generating a route for the vehicle. These costs may be identified using a routing process, such as routing process 402 in FIG. 4.

A cost of transition or movement between grid point i and grid point j, c(i,j) in grid 1400 is defined for a set of grid point pairs (i,j). In this example, c(i,j) may be comprised of more than one factor. The desired optimum path across the entire grid of grid points is defined as that path, such that the sum of the individual transition costs, c(i,j), across each pair of grid points comprising the optimum path is minimized.

The cost function between grid points, c(i,j), for the routing process, in these advantageous embodiments, may consider a number of cost factors. In this illustrative example, two cost factors, total trip time and required line of sight to communication nodes, are considered. Speed may be identified and line of sight requirements may be identified for a vehicle using a vehicle model, such as vehicle model 600 in FIG. 6 in these illustrative examples.

Of course, other cost factors other than, or in addition to, these may be considered in other examples. Total trip time may be based on speed. Speed is a function of forward slope, side slope, and surface conditions in this example. Speed is zero if forward slope or side slope exceeds maximums for surface conditions. The total trip time also is affected by battery recharge time from energy usage cryogenic recovery time depending on illumination and the vehicle.

Battery recharge time also may be identified using a vehicle model along with illumination information that may be present in a spatial model, such as spatial model 500 in FIG. 5. With required line of sight to communication nodes, a penalty function for loss of line of sight may be used in identifying a cost. A possible additional penalty or cost may occur for not having at least some selected number of line of sight links to communication nodes at any point in time, while traveling from a start point to an end point.

The cost between each pair of grid points is composed of a weighted sum of cost components. Components are numerically added using empirically derived weighting factors across the terrain as defined by the spatial model, trafficability, and communications grid. Energy management is incorporated into the routing process with the addition of a third dimension to grid 1400. This third dimension represents the energy level on the rover. As energy is consumed, the algorithm moves down the third dimension. As energy is acquired, the algorithm moves up this third dimension.

In generating a route in grid 1400, a start point (A) and a particular grid point, p, is considered within the entire set of grid points. An optimum minimum cost path from start point (A) to grid point p is known. The minimum cost associated with the path from start point (A) to grid point p is labeled as l(p). Grid point p is considered a permanently labeled grid point because the minimum cost path from start point (A) to grid point p is known.

A number of grid points in a neighborhood of grid point p containing all non-permanently labeled grid points which can be reached from grid point p is identified. This number of identified grid points is a number of non-permanently labeled grid points and is called $\Gamma(p)$. The grid points within $\Gamma(p)$ are defined as $i_k \in \Gamma(p)$, $k=1, 2, \ldots N_p$.

The routing process expands the tree of permanently labeled grid points until a grid point that coincides with the end point (B) is reached and re-labeled as permanent. The associated path of nodes from start point (A) to end point (B) is the minimum cost path.

Each non-permanently labeled grid point, $i_k \in \Gamma(p)$, has an associated temporary label, $l(i_k)$, containing a path of grid points from start point (A) through the set of permanently labeled grid points. In these illustrative examples, $l(i_k)$ is the cost of the path from start point (A) to grid point $i_k$. For each grid point $i_k$, the cost $l(p)+c(i_p,i_k)$ is identified. If $l(p)+c(i_p,i_k) < l(i_k)$, $l(i_k)$ is relabeled with the cost $l(p)+c(i_p,i_k)$, the associated path is adjusted through grid point p. Then grid point $i_{k*}$ is selected such that $l(i_{k*}) < l(i_k)$ for all $i_k \in$ the set of non-permanently labeled grid points. Finally, $i_{k*}$ is relabeled as the new permanent label, l(p), and the process is repeated until a grid point $i_{k*}$ is reached that coincides with the end point (B).

Figure 15:
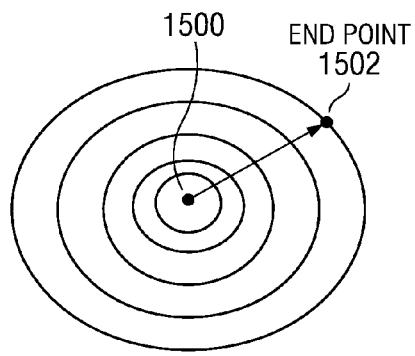
FIG. 15 is a diagram illustrating the use of Dijkstra's algorithm in a routing process in accordance with an advantageous embodiment.

Turning now to FIG. 15, a diagram illustrating the use of Dijkstra's algorithm in a routing process is depicted in accordance with an advantageous embodiment. In one embodiment, a flat objective function space is employed to identify the cost to travel from start point 1500 to end point 1502. In this implementation, the routing process using Dijkstra's algorithm searches over an ever-increasing circle until end point 1502 is found.

Figure 16:
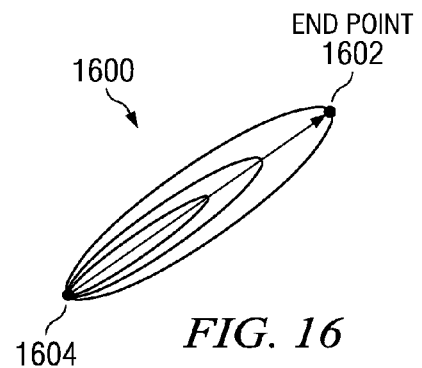
FIG. 16 is a diagram illustrating the use of the A Star algorithm in a routing process in accordance with an advantageous embodiment.

Turning now to FIG. 16, a diagram illustrating the use of the A Star algorithm in a routing process is depicted in accordance with an advantageous embodiment. In this example, graph 1600 illustrates a search made using a modification to Dijkstra's algorithm in a routing process. Dijkstra's algorithm is also referred to as the A Star algorithm or A* algorithm in these illustrative examples.

This type of search is made by setting the total cost equal to L(P)+C(P,N)+E(N,End). L(P) is the label value for the grid point, and C(P,N) is the cost of traveling from the permanent grid point to the neighbor grid point. E(N,End) is an estimate of the total cost to travel from the neighbor point to the actual end point. In these examples, the estimate is typically an under estimate to ensure that an optimal route is created.

In this particular example, the use of the modified Dijkstra's algorithm searches over an ever-increasing ellipse until end point 1602 is found. This ellipse has a long skinny shape as compared to the circle or search performed in FIG. 15. As a result, a smaller area is searched reducing the amount of processing time needed. Either approach in FIG. 15 and FIG. 7 may be used depending on the particular implementation and performance needs.

Figure 17:
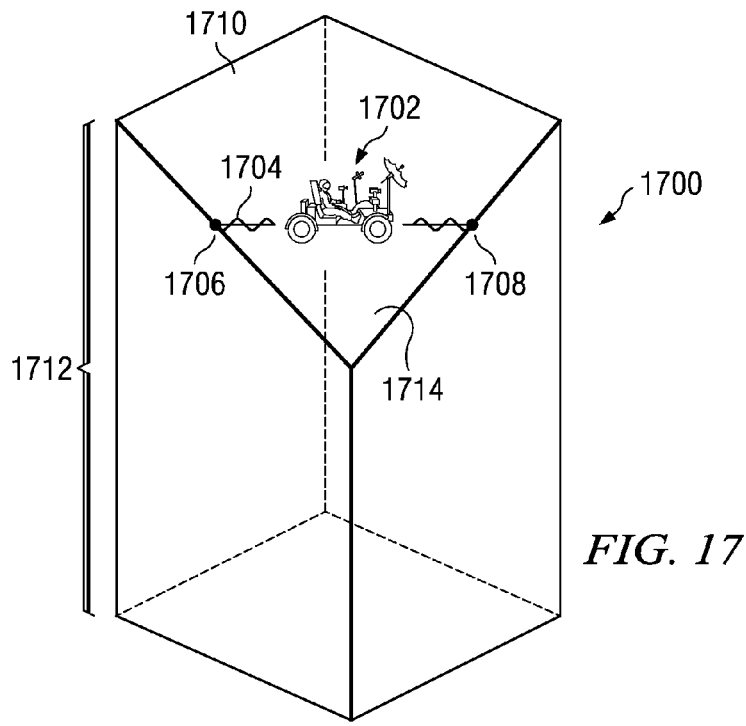
FIG. 17 is a diagram illustrating a pictorial view of a grid square in accordance with an advantageous embodiment.

With reference now to FIG. 17, a diagram illustrating a pictorial view of a grid square is depicted in accordance with an advantageous embodiment. Grid square 1700 is an example of a grid square that may be formed when a two-dimensional space for a terrain is divided up into a grid. In particular, grid square 1700 may be an example of a polygon within polygons 504 for grid 502 and spatial model 500 in FIG. 5.

This spatial model may model terrain such as, for example, terrain 112 in FIG. 1. Data for grid square 1700 is not stored in a pictorial format in actual implementation. This illustration of grid square 1700 is provided in which information about the terrain is shown in a pictorial form rather than as data to facilitate an explanation of identifying costs for traversing grid squares such as, for example, grid square 1700.

Vehicle 1702 crosses grid square 1700 via path 1704. Path 1704 enters grid square 1700 at point 1706 and leaves the grid square at point 1708. The terrain gradient and surface conditions are constant across grid square 1700 in this illustrative example. Grid square 1700 has surface 1710, in which elevation 1712 changes to form slope 1714 in surface 1710.

Given the surface conditions and the forward slope and side slope along path 1704, the vehicle model for vehicle 1702 provides the time to traverse path P and the energy consumed traversing path 1704. The vehicle model for vehicle 1702 may be, for example, vehicle model 600 in FIG. 6.

The vehicle model provides the energy generated as vehicle 1702 traverses path 1704. The energy generated can simply be a function of time for a nuclear power unit. The energy generated also can be a function of time and relative aspect to the sun for a solar power supply. If vehicle 1702 has regenerative breaking, energy is generated when vehicle 1702 stops or goes downhill. The model of vehicle 1702 identifies the energy generated from regenerative braking. The energy in the battery at point 1708 is a function at the energy in the battery at point 1706, the energy produced along path 1704, the energy used along path 1704, and the efficiency of the battery.

Figure 18:
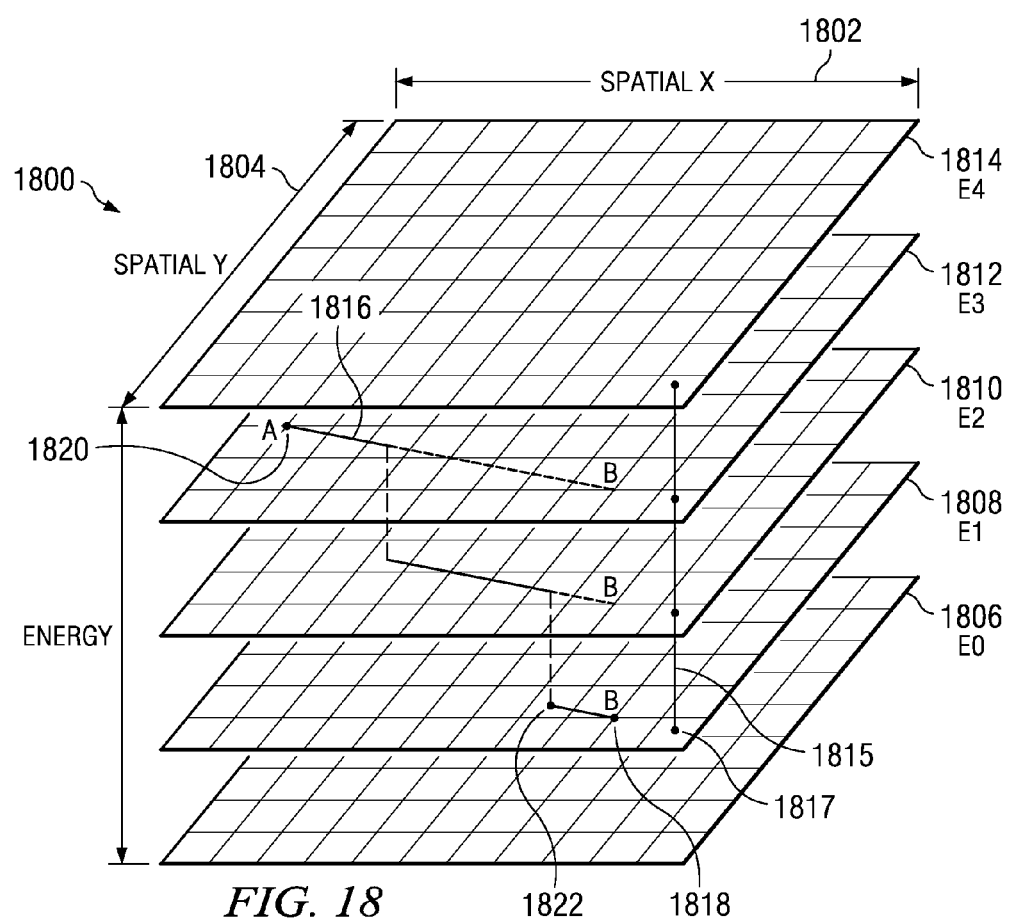
FIG. 18 is a diagram of a grid with energy management in accordance with an advantageous embodiment.

With reference now to FIG. 18, a diagram of a grid with energy management is depicted in accordance with an advantageous embodiment. In this example, grid 1800 is an example of a three-dimensional grid such as, for example, grid 502 for spatial model 500 in FIG. 5. Energy management may be taken into account through the use of levels within grid 1800. In this example, grid 1800 includes levels 1806, 1808, 1810, 1812, and 1814.

Level 1806 corresponds to an energy level E0, level 1808 corresponds to an energy level E1, level 1810 corresponds to an energy level E2, level 1812 corresponds to an energy level E3, and level 1814 corresponds to an energy level E4. The energy levels increase as the levels increase, in this example. For example, energy level E0 for level 1806 is the lowest energy level, while energy level E4 for level 1814 is the highest energy level. Of course, in other advantageous embodiments, other numbers of energy levels may be used depending on the particular implementation.

Further, level 1806 also may represent the spatial grid information for the terrain. The grid squares in the other levels only contain information relating to energy levels. In this example, terrain information may be present along arrows 1802 and 1804 for a spatial identification of terrain.

Each grid element has an associated column of grid squares in which each grid square has an energy level representing the amount of energy stored in a battery. For example, column 1815 is associated with grid element 1817. Energy level E0 is the lowest energy level for the battery that may be acceptable and may be no energy depending on the particular implementation. An energy level of E4 is the highest energy level for the battery.

The energy level may be identified based on the amount of energy present as the amount of energy collected and the amount of energy used. If the amount of energy used exceeds the amount of energy collected, the process moves down in levels. If the amount of energy collected exceeds the amount of energy used, the process moves upward in the levels.

In generating route 1816 from start point 1818 to end point 1820, the routing process may take into account changes in energy levels for the battery. Further, the routing process also may minimize the travel time from start point 1818 to end point 1820 as an input parameter.

In routing the vehicle to generate route 1816, the routing process performs two types of moves. These moves may be spatial and/or energy moves. The spatial move may generate an identification of another grid square within grid 1800 to be used in route 1816.

This identification of the grid square on the spatial level also takes into account energy. In identifying the energy move, a vehicle may sit still to allow for a battery to charge up. This type of move stays at the same spatial location within grid 1800 by staying in the same spatial location, a move within the grid may occur with respect to energy levels rather than spatial changes.

For example, at grid square 1822, a vehicle may stay put for some amount of time to allow the energy level to move from level 1808 to level 1810. The cost for this type of energy move from one level to another level is the time it takes to charge the battery to each energy level. As route 1816 moves from one grid square to another grid square on the spatial level, the process calculates the cost and the resulting energy level at the end of the move. This movement may be through all three dimensions within grid 1800.

In these examples, the identification of charging or use of energy may occur based on the model for the vehicle and the terrain identified by the spatial model.

Although this example was explained with respect to a battery, other advantageous embodiments may have changes in energy levels due to other types of power supply systems. For example, with a nuclear power unit, the energy may be constant, and the change in levels may only occur with respect to usage of available energy rather than storage of energy.

Of course, more than one path may move through each spatial grid point. For example, one route may arrive at level 1808 as described in this example. In another example, another route through grid 1800 may arrive at grid square 1818 at level 1812.

In these examples, as a vehicle spends time collecting energy, the costs to traverse a particular route increases. When multiple routes are generated, the selected route may be one that reaches the end point at the desired energy level.

Figure 19:
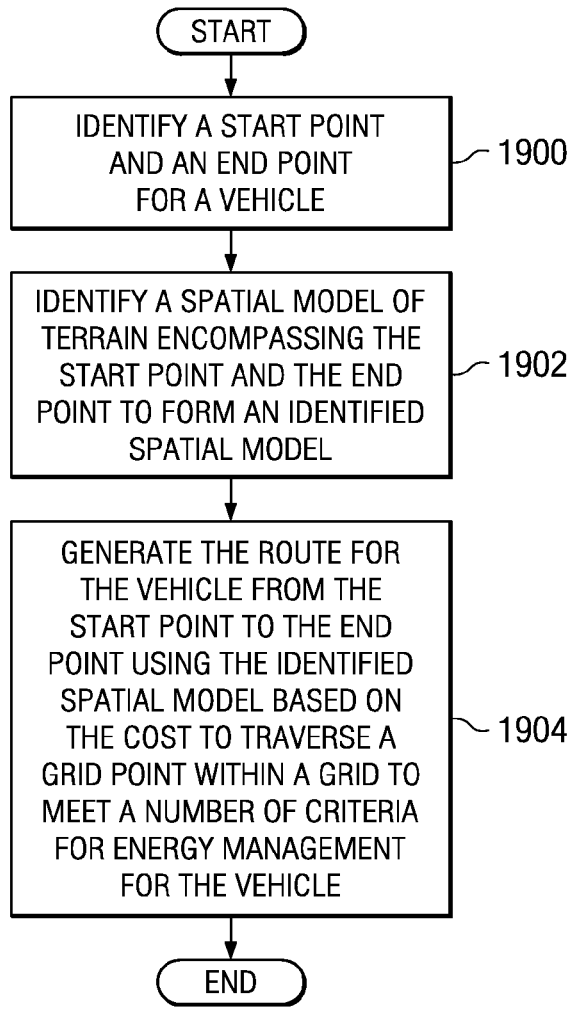
FIG. 19 is a flowchart of a process for generating a route for a vehicle in accordance with an advantageous embodiment.

With reference now to FIG. 19, a flowchart of a process for generating a route for a vehicle is depicted in accordance with an advantageous embodiment. The process illustrated in FIG. 19 may be implemented in a software component such as, for example, routing process 402 in FIG. 4.

The process begins by identifying a start point and an end point for a vehicle (operation 1900). The start point and the end point may be the start and end points for an entire route of the vehicle. In other advantageous embodiments, the start point and the end point may be a subsection of a route for the vehicle.

The process identifies a spatial model of terrain encompassing the start point and the end point to form an identified spatial model (operation 1902). A route is generated for the vehicle from the start point to the end point using the identified spatial model based on the cost to traverse a grid point within a grid to meet a number of criteria for energy management for the vehicle (operation 1904), with the process terminating thereafter.

Figure 20:
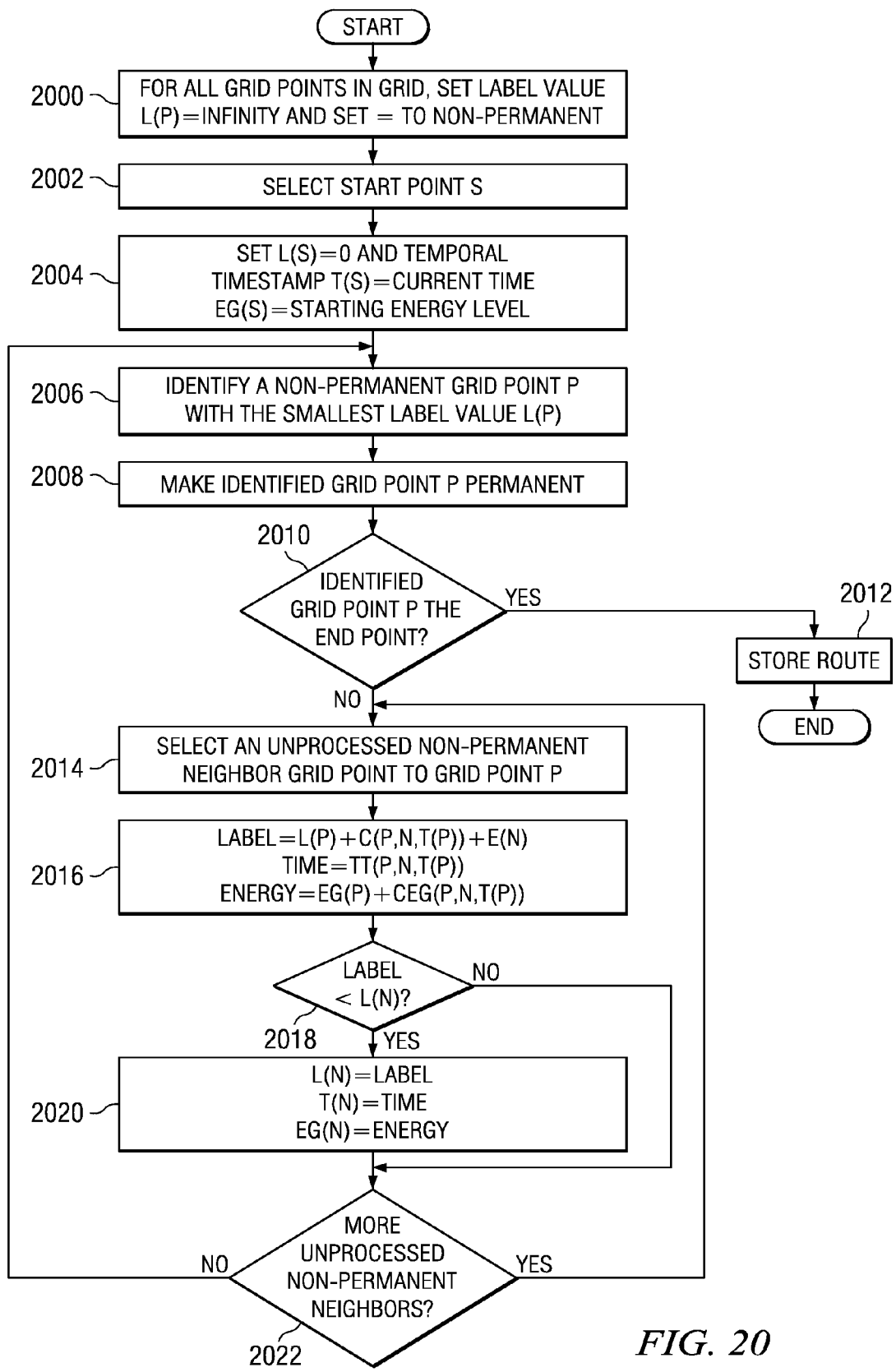
FIG. 20 is a flowchart of a process for identifying an optimal route in accordance with an advantageous embodiment.

With reference now to FIG. 20, a flowchart of a process for identifying an optimal route is depicted in accordance with an advantageous embodiment. The process in FIG. 20 is a more detailed illustration of operation 1904 in FIG. 19.

The process begins by setting a label value L(P) equal to infinity and setting equal to non-permanent for all grid points in the grid (operation 2000). Thereafter, start point S is selected (operation 2002). The label L(S) is set equal to 0, the temporal timestamp for the grid point is set equal to current time, and the energy of the grid point EG(S) is set to the vehicle's starting energy level (operation 2004).

Next, a non-permanent grid point P with the smallest label value L(P) is identified (operation 2006). The first time operation 2006 is performed, grid point P is the start point and will become permanent because its label value is 0 while all the other grid points have a label value of infinity. The identified grid point P is made permanent (operation 2008).

Thereafter, determination is made as to whether the identified grid point P is the end point (operation 2010). If the identified grid point P is the end point, the route is then stored (operation 2012), with the process terminating thereafter.

Otherwise, an unprocessed non-permanent neighbor grid point to grid point P is selected for processing (operation 2014). The variable LABEL for this selected non-permanent neighbor grid point is set equal to the L(P)+C(P,N,T(P))+E(N), the variable TIME is set equal to TT(P,N,T(P)), and the variable ENERGY is set to EG(P)+CEG(P,N,T(P)) (operation 2016). L(P) is the label value for the grid point made permanent in operation 2008.

P represents grid point P that was made permanent in operation 2008. C(P,N,T(P)) is the cost to traverse from grid point P to grid point N starting with time T(P). N represents the neighbor grid point selected for processing in operation 2014. E(N) is the estimate of the cost from N to the end. T is the time stamp for grid point P identified as the permanent grid point in operation 2008. TT(P,N,T(P)) is the time when the traversal from grid point P to grid point N completes that started at time T(P). CEG(P,N,T(P)) is the change in energy while traversing the path between P and N starting at time T(P). Operation 2016 is described in more detail in FIG. 21 below.

Next, a determination is made as to whether the value of variable LABEL in operation 2016 is less than L(N) (operation 2018). L(N) is the label value for the neighbor grid point N selected for processing in operation 2014. In other words, a determination is made as to whether the value for the variable LABEL generated in operation 2016 is less than the label value for the neighbor being processed.

In operation 2018, if variable LABEL is less than L(N), then the value of L(N) is set equal to the value for the variable LABEL, T(N) is set equal to the value of time as identified in operation 2016, and EG(N) is set to the variable ENERGY (operation 2020). L(N) is the value for the neighbor being processed, and T(N) is the temporal timestamp for the neighbor being processed.

Thereafter, a determination is made as to whether more unprocessed non-permanent neighbors of identified point P in operation 2008 are present (operation 2022). If additional neighbor grid points are present, the process returns to operation 2014 to select another unprocessed non-permanent neighbor for processing. Otherwise, the process returns to operation 2006 to identify another non-permanent grid point P for processing.

With reference again to operation 2018, if the value of the variable LABEL is not less than L(N), the process proceeds to operation 2022 as described above.

Figure 21:
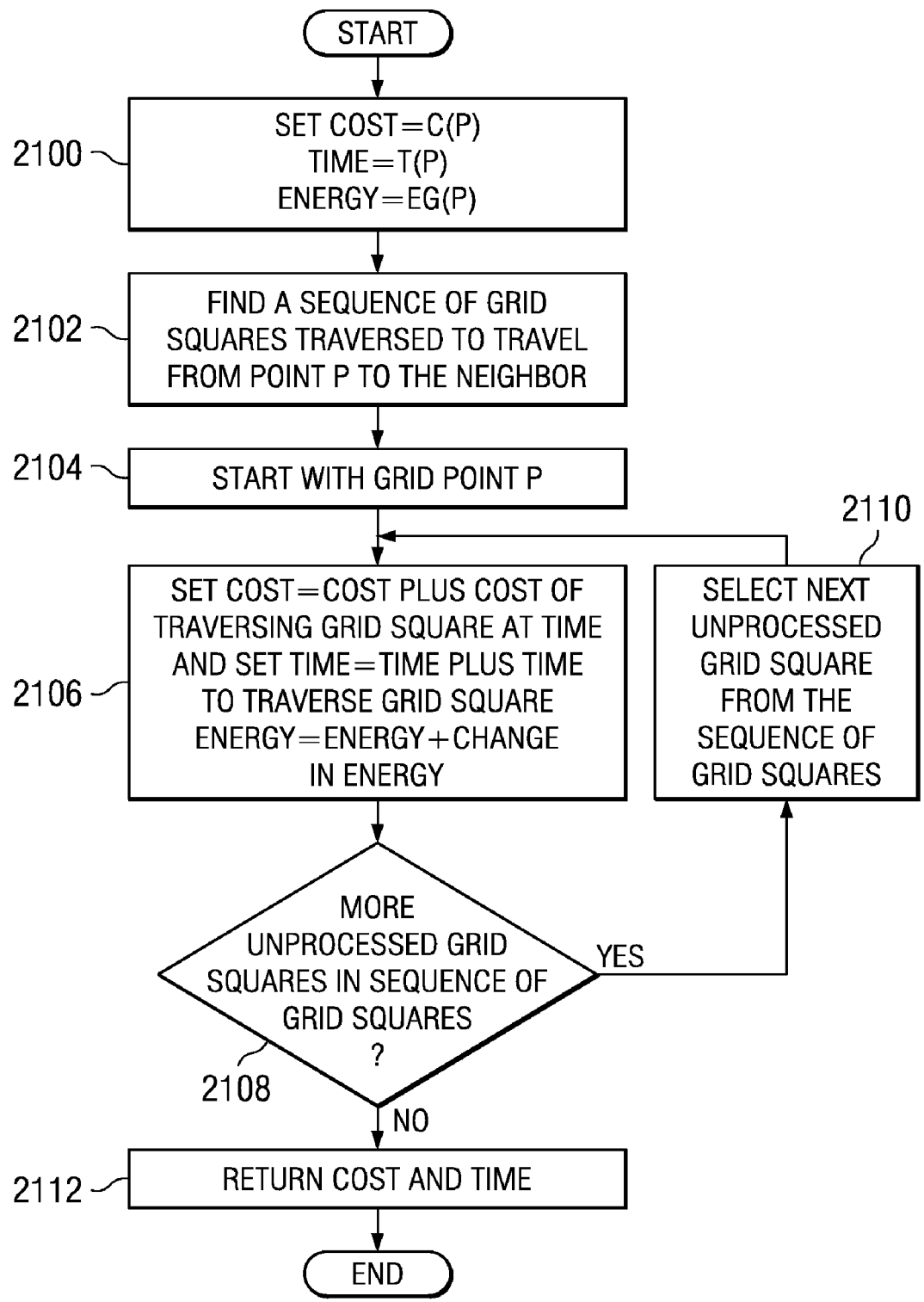
FIG. 21 is a flowchart of a process for identifying the cost to traverse from a grid point to a neighbor in accordance with an advantageous embodiment.

Turning next to FIG. 21, a flowchart of a process for identifying the cost to traverse from grid point P to a neighbor is depicted in accordance with an advantageous embodiment. The process illustrated in FIG. 21 is a more detailed explanation of operation 2016 in FIG. 20.

The process begins by setting the variable COST equal to C(P), the variable time equal to T(P), and the variable ENERGY equal to EG(P) (operation 2100). Thereafter, a sequence of squares that are crossed to traverse from point P to the neighbor is found (operation 2102). An example of this sequence of squares is found in FIG. 13. In this example, the sequence of grid squares starts with the square containing grid point P (operation 2104). The grid squares are processed in order from grid point P to the neighbor grid point N in these depicted examples.

The process sets the variable COST to cost plus the cost of traversing the grid square at time T, sets the variable TIME equal to time plus the time to traverse the grid square, and sets the variable ENERGY to ENERGY plus the change in energy while traversing the grid square (operation 2106). In other words, the value of the variable COST is incremented with the cost of traversing the grid square at the value of the variable time. The value for the variable time is incremented with the value of the time to traverse the grid square that is being processed. The variable ENERGY is incremented by the change in energy traversing the grid square.

The cost for traversing a grid square may be a function of speed and energy usage. In incrementing the value of the variable COST, the value of the variable COST is set equal to the current value of this variable plus the cost to traverse the grid square at time T. In incrementing the value for the variable TIME, the current value for this variable is added to the time needed to traverse the grid square.

Thereafter, a determination is made as to whether more unprocessed grid squares are present in the sequence of grid squares (operation 2108). As mentioned above, this set of grid squares is a sequence of grid squares that are traversed from grid point P to grid point N. If additional unprocessed grid squares are present, the process selects the next unprocessed grid square from the sequence of grid squares (operation 2110). The process then returns to operation 2106. Otherwise, the values for variable COST and TIME are returned (operation 2112), with the process terminating thereafter.

Figure 22:
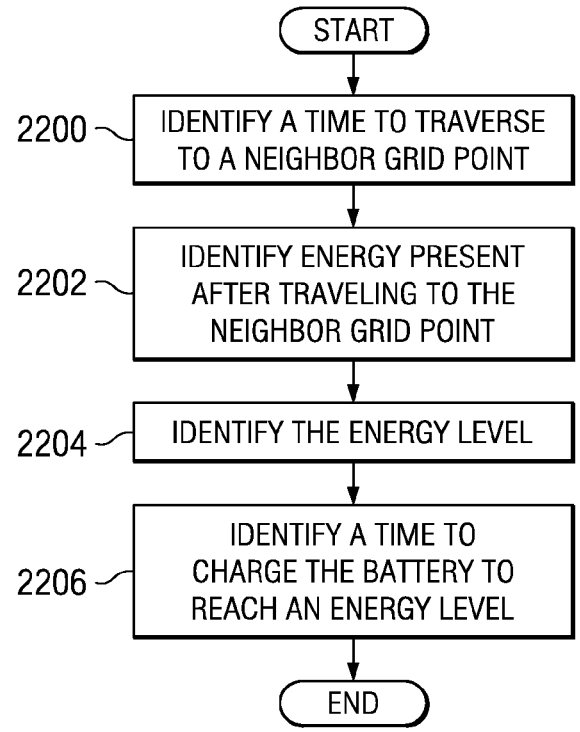
FIG. 22 is a flowchart of a process for identifying a cost to traverse a square and a time needed to traverse a square in accordance with an advantageous embodiment.

With reference now to FIG. 22, a flowchart of a process for identifying a cost to traverse a square and a time needed to traverse a square is depicted in accordance with an advantageous embodiment. The process illustrated in FIG. 22 is a more detailed explanation of operation 2106 in FIG. 21.

The process begins by identifying a time to traverse to a neighbor grid point (operation 2200). The time to traverse to a neighbor grid point may be identified based on the model of the vehicle and the terrain identified from the spatial model. The process identifies the energy present after traveling to the neighbor grid point (operation 2202). The energy may be identified using a model of the vehicle to identify energy consumption as compared to energy during generation.

The process identifies the energy level for the vehicle (operation 2204). This energy level may be the level of charge in a battery for the vehicle. The process then identifies a time to charge the battery to reach an energy level (operation 2206), with the process terminating thereafter.

Thus, the different advantageous embodiments provide a method, apparatus, and computer program code for generating routes. In particular, the advantageous embodiments may be applied to generating routes for vehicles such as, for example, rovers. The different advantageous embodiments generate a route by identifying a start point and an end point.

The spatial model of terrain encompassing a start point and an end point is identified. A route is generated for the vehicle from the start point to the end point using the identified spatial model based on the cost to traverse a grid point within a grid to meet a number of criteria for energy management of the vehicle.

Further, other parameters in addition to energy management may be taken into account. These other parameters may include, for example, total trip time, minimum speed, and other information. This type of information may be generated from a model of the vehicle.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or computer-usable program code such that when the computer-readable or computer-usable program code is executed on a computer, the execution of this computer-readable or computer-usable program code causes the computer to transmit another computer readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art.

Although the different advantageous embodiments have been described with respect to generating a vehicle on a terrain such as a lunar terrain, other advantageous embodiments may be applied to other terrain. For example, the different advantageous embodiments may be applied to generate routes to terrain located on other planetary bodies such as, for example, the earth, Mars, an asteroid, or some other body.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating a route for a vehicle, the method comprising:
   identifying a start point and an end point for the vehicle;
   identifying a spatial model of terrain encompassing the start point and the end point to form an identified spatial model; and
   generating by a processor the route for the vehicle from the start point to the end point using the spatial model based on a cost to traverse a grid point within a grid to meet a number of criteria for energy management for the vehicle using variations of Dijkstra's algorithm with minimum angular resolution to determine a number of neighboring grid points within the spatial model.

2. The method of claim 1 further comprising:
   identifying the cost to traverse the grid point within the grid using the spatial model and a vehicle model for the vehicle.

3. The method of claim 1, wherein the start point is the grid point and is assigned an initial label value and all other grid points have a label value of infinity and wherein the generating step comprises:
   designating a non-permanent grid point with a smallest label value as a permanent grid point;
   generating label values for a plurality of neighbor grid points that are non-permanent, wherein each label value in the label values represents the cost to traverse from the permanent grid point to a neighbor grid point; and
   repeating the designating and generating steps until the end point is reached while meeting the number of criteria for the energy management.

4. The method of claim 3, wherein a label value is generated as:

Label=$L(P)+C(P,N,T(P))+E(N)$, wherein Label is the label value, L(P) is a label value for the permanent grid point P, C(P, N, T(P)) is a cost of traveling from the permanent grid point P to a selected neighbor grid point N starting at a selected time, and E(N) is an estimated cost to traverse the route between the selected neighbor grid point N and the end point.

5. The method of claim 4, wherein the cost comprises a number of factors including at least total trip time, required line of sight to a communications node, energy usage, and speed.

6. The method of claim 5, wherein the number of factors is unevenly weighted.

7. The method of claim 1, wherein the generating step comprises:
generating the route for the vehicle from the start point to the end point using the identified spatial model based on the cost to traverse the grid point within the grid to meet the number of criteria for the energy management and at least one of a number of criteria from an illumination level, a number of communications links, and terrain roughness.

8. The method of claim 1, wherein the step of identifying the spatial model of the terrain encompassing the start point and the end point to form the identified spatial model comprises:
identifying the spatial model of the terrain encompassing the start point and the end point; and
including a plurality of energy levels within the spatial model as another dimension to form the identified spatial model.

9. The method of claim 8, wherein the step of identifying the spatial model of the terrain encompassing the start point and the end point to form the identified spatial model further comprises:
identifying at least one of solar illumination over the spatial model and a required line of sight to a communications node.

10. The method of claim 8, wherein the step of identifying the spatial model of the terrain encompassing the start point and the end point to form the identified spatial model further comprises:
including energy usage based on the terrain; and
including speed based on the terrain, wherein the energy usage and the speed are identified from a vehicle model for the vehicle.

11. The method of claim 10, wherein the energy usage is a function of a type of vehicle and the terrain, and the speed is a function of the type of vehicle and the terrain.

12. The method of claim 11, wherein the terrain comprises side slope, forward slope, and a surface condition for a number of locations within the terrain.

13. The method of claim 1, wherein the step of generating the route for the vehicle from the start point to the end point using the spatial model based on the cost to traverse the grid point within the grid to meet the number of criteria for the energy management for the vehicle comprises:
generating the route for the vehicle from the start point to the end point using the spatial model based on the cost to traverse the grid point within the grid to meet the number of criteria for the energy management for the vehicle, wherein the route comprises a number of segments in which each segment is associated with an energy level from a number of energy levels.

14. The method of claim 13 further comprising:
adjusting the energy level associated with the each segment based on the actual energy level in a storage for the vehicle.

15. The method of claim 1, wherein the vehicle is selected from one of a mobile land-based platform, a rover, a lunar rover, a land-based spacecraft, a tank, and a personnel carrier.

16. A method for generating a route for a rover, the method comprising:
identifying a start point and an end point for the rover;
identifying a spatial model of terrain encompassing the start point and the end point, wherein the terrain comprises a gradient, and a surface condition for a number of locations within the terrain;
including a plurality of energy levels within the spatial model as another dimension to form an identified spatial model; and
generating by a processor the route for the rover from the start point to the end point using the identified spatial model based on a cost to traverse a grid point within a grid to meet a number of criteria for energy management for the rover vehicle using variations of Dijkstra's algorithm with minimum angular resolution to determine a number of neighboring grid points within the spatial model, wherein the route comprises a number of segments in which each segment is associated with an energy level from the plurality of energy levels.

17. The method of claim 16, wherein the cost comprises a number of factors selected from at least one of total trip time, required line of sight to a communication node, energy usage, and speed.

18. The method of claim 16, wherein the start point is the grid point and is assigned an initial label value and all other grid points have a label value of infinity, and wherein the generating step comprises:
designating a non-permanent grid point with a smallest label value as a permanent grid point;
generating label values for a plurality of neighbor grid points that are non-permanent, wherein each label value in the label values represents the cost to traverse from the permanent grid point to a neighbor grid point; and
repeating the designating and generating steps until the end point is reached while meeting the number of criteria for the energy management.

19. The method of claim 18, wherein a label value is generated as:
Label=$L(P)+C(P, N, T(P))+E(N)$, wherein Label is the label value, L(P) is a label value for the permanent grid point P, C(P, N, T(P)) is a cost of traveling from the permanent grid point P to a selected neighbor grid point N starting at a selected time, and E(N) is an estimated cost to traverse the route between the selected neighbor grid point N and the end point.

20. An apparatus comprising:
a computer;
program code for a route generation process stored on the computer, wherein the computer is capable of executing the program code to identify a start point and an end point for a rover; identify a spatial model of terrain encompassing the start point and the end point, wherein the terrain comprises a gradient, and a surface condition for a number of locations within the terrain; include a plurality of energy levels within the spatial model as another dimension to form the spatial model; and generate the route for the rover from the start point to the end point using the spatial model based on a cost to traverse a grid point within a grid to meet a number of criteria for energy management for a vehicle using variations of Dijkstra's algorithm with minimum angular resolution to determine a number of neighboring grid points within the spatial model, wherein the route comprises a number of segments in which each segment is associated with an energy level from the plurality of energy levels.

21. The apparatus of claim 20 further comprising:
the vehicle, wherein the vehicle is capable of moving from the start point to the end point using the route.

22. The apparatus of claim 21, wherein the computer is located within the vehicle.

23. The apparatus of claim 21, wherein the computer is located in a location remote to the vehicle and wherein the computer is capable of transmitting the route to the vehicle.

24. The apparatus of claim 21, wherein the vehicle is selected from one of a mobile land-based platform, a rover, a lunar rover, a land-based spacecraft, a tank, and a personnel carrier.

25. A computer program product for generating a route for a vehicle, the computer program product comprising:
a computer recordable storage medium;
program code, stored on the computer recordable storage medium, for identifying a start point and an end point for the vehicle;
program code, stored on the computer recordable storage medium, for identifying a spatial model of terrain encompassing the start point and the end point to form an identified spatial model; and
program code, stored on the computer recordable storage medium, for generating the route for the vehicle from the start point to the end point using the spatial model based on a cost to traverse a grid point within a grid to meet a number of criteria for energy management for the vehicle using variations of Dijkstra's algorithm with minimum angular resolution to determine a number of neighboring grid points within the spatial model.

26. The computer program product of claim 25 further comprising:
program code, stored on the computer recordable storage medium, for identifying the cost to traverse the grid point within the grid using the spatial model and a vehicle model for the vehicle.

27. The computer program product of claim 25, wherein the start point is the grid point and is assigned an initial label value and all other grid points have a label value of infinity and wherein the program code, stored on the computer recordable storage medium, for generating the route for the vehicle from the start point to the end point using the spatial model based on the cost to traverse the grid point within the grid to meet the number of criteria for the energy management for the vehicle comprises:
program code, stored on the computer recordable storage medium, for designating a non-permanent grid point with a smallest label value as a permanent grid point;
program code, stored on the computer recordable storage medium, for generating label values for a plurality of neighbor grid points that are non-permanent, wherein each label value in the label values represents the cost to traverse from the permanent grid point to a neighbor grid point; and
program code, stored on the computer recordable storage medium, for repeating the designating and generating steps until the end point is reached while meeting the number of criteria for the energy management.

28. The computer program product of claim 27, wherein a label value is generated as:

$$Label = L(P) + C(P, N, T(P)) + E(N),$$

wherein Label is the label value, $L(P)$ is a label value for the permanent grid point P, $C(P, N, T(P))$ is a cost of traveling from the permanent grid point P to a selected neighbor grid point N starting at a selected time, and $E(N)$ is an estimated cost to traverse the route between the selected neighbor grid point N and the end point.

29. The computer program product of claim 28, wherein the cost comprises a number of factors including at least total trip time, required line of sight to a communications node, energy usage, and speed.

30. The computer program product of claim 29, wherein the number of factors is unevenly weighted.

31. The computer program product of claim 25, wherein the program code, stored on the computer recordable storage medium, for generating the route for the vehicle from the start point to the end point using the spatial model based on the cost to traverse the grid point within the grid to meet the number of criteria for the energy management for the vehicle comprises:
program code, stored on the computer recordable storage medium, for generating the route for the vehicle from the start point to the end point using the identified spatial model based on the cost to traverse the grid point within the grid to meet the number of criteria for the energy management and at least one of a number of criteria from an illumination level, a number of communications links, and terrain roughness.

32. The computer program product of claim 25, wherein the program code, stored on the computer recordable storage medium, for identifying the spatial model of terrain encompassing the start point and the end point to form the identified spatial model comprises:
program code, stored on the computer recordable storage medium, for identifying the spatial model of the terrain encompassing the start point and the end point; and
program code, stored on the computer recordable storage medium, for including a plurality of energy levels within the spatial model as another dimension to form the identified spatial model.

33. The computer program product of claim 32, wherein the program code, stored on the computer recordable storage medium, for identifying the spatial model of terrain encompassing the start point and the end point to form the identified spatial model further comprises:
program code, stored on the computer recordable storage medium, for identifying at least one of solar illumination over the spatial model and a required line of sight to a communications node.

34. A computer program product for generating a route for a rover, the computer program product comprising:
a computer recordable storage medium;
program code, stored on the computer recordable storage medium, for identifying a start point and an end point for the rover;
program code, stored on the computer recordable storage medium, for identifying a spatial model of terrain encompassing the start point and the end point, wherein the terrain comprises a gradient, and a surface condition for a number of locations within the terrain;
program code, stored on the computer recordable storage medium, for including a plurality of energy levels within the spatial model as another dimension to form an identified spatial model; and program code, stored on the computer recordable storage medium, for generating the route for the rover from the start point to the end point using the identified spatial model based on a cost to traverse a grid point within a grid to meet a number of criteria for energy management for the rover using variations of Dijkstra's algorithm with minimum angular resolution to determine a number of neighboring grid points within the spatial model, wherein the route comprises a number of segments in which each segment is associated with an energy level from the plurality of energy levels.

35. The computer program product of claim 34, wherein the cost comprises a number of factors selected from at least one of total trip time, required line of sight to a communications node, energy usage, and speed.

36. The computer program product of claim 34, wherein the start point is the grid point and is assigned an initial label value and all other grid points have a label value of infinity and wherein the program code, stored on the computer recordable storage medium, for generating the route for the rover from the start point to the end point using the identified spatial model based on the cost to traverse the grid point within the grid to meet the number of criteria for the energy management for the rover, wherein the route comprises the number of segments in which the each segment is associated with the energy level from the plurality of energy levels comprises:

program code, stored on the computer recordable storage medium, for designating a non-permanent grid point with a smallest label value as a permanent grid point;

program code, stored on the computer recordable storage medium, for generating label values for a plurality of neighbor grid points that are non-permanent, wherein each label value in the label values represents the cost to traverse from the permanent grid point to a neighbor grid point; and program code, stored on the computer recordable storage medium, for repeating the designating and generating steps until the end point is reached while meeting the number of criteria for the energy management.

37. The computer program product of claim 36, wherein a label value in the label values is generated as:

Label=$L(P)+C(P, N, T(P))+E(N)$, wherein Label is the label value, $L(P)$ is a label value for the permanent grid point P, $C(P, N, T(P))$ is a cost of traveling from the permanent grid point P to a selected neighbor grid point N starting at a selected time, and $E(N)$ is an estimated cost to traverse the route between the selected neighbor grid point N and the end point.

* * * * *